US008766929B2

(12) United States Patent  (10) Patent No.: US 8,766,929 B2
Yilmaz  (45) Date of Patent: Jul. 1, 2014

(54) PANEL FOR POSITION SENSORS

(75) Inventor: Esat Yilmaz, Southampton (GB)

(73) Assignee: Atmel Corporation, San Jose, CA (US)

( * ) Notice: Subject to any disclaimer, the term of this patent is extended or adjusted under 35 U.S.C. 154(b) by 943 days.

(21) Appl. No.: 12/780,436

(22) Filed: May 14, 2010

(65) Prior Publication Data
US 2011/0279400 A1 Nov. 17, 2011

(51) Int. Cl.
G06F 3/041 (2006.01)
(52) U.S. Cl.
USPC ............... 345/173; 178/18.01; 178/19.01
(58) Field of Classification Search
USPC ............... 178/18.01–19.07; 345/173–178
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2007/0074914 A1* | 4/2007 | Geaghan et al. | 178/18.06 |
| 2008/0246496 A1* | 10/2008 | Hristov et al. | 324/686 |
| 2008/0309635 A1 | 12/2008 | Matsuo | |
| 2009/0194344 A1* | 8/2009 | Harley et al. | 178/18.06 |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO  WO 2012/129247  9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

Primary Examiner — Michael Pervan
(74) Attorney, Agent, or Firm — Baker Botts LLP

(57) ABSTRACT

This document discloses systems, methods, and articles of manufactures, related to position sensors and uses therefor. Various patterns of drive electrodes and sense electrodes that can be used to in a panel for a position sensor are shown and described. In various examples, the drive electrodes and sense electrodes can be arranged in a grid-like matrix.

13 Claims, 27 Drawing Sheets

PANEL FOR POSITION SENSORS

TECHNICAL FIELD

The present subject matter relates to techniques and equipment for position sensing. In particular, the present subject matter relates to a panel for two-dimensional position sensors.

BACKGROUND

A position sensor is a device that can detect the presence and location of a touch, by a user's finger or by an object, such as a stylus, for example, within a display area of the position sensor display screen. In a touch sensitive display application, the position sensor enables a user to interact directly with what is displayed on the screen, rather than indirectly with a mouse or touchpad. Position sensors can be attached to or provided as part of computers, personal digital assistants (PDAs), satellite navigation devices, mobile telephones, portable media players, portable game consoles, public information kiosks, point of sale systems, and the like. Position sensors have also been used as control panels on various appliances.

There are a number of different types of position sensors/touch screens, such as resistive touch screens, surface acoustic wave touch screens, capacitive touch screens, and the like. A capacitive touch screen, for example, may include an insulator, coated with a transparent conductor in a particular pattern. When an object, such as a user's finger or a stylus, touches or is provided in close proximity to the surface of the screen there is a change in capacitance. This change in capacitance is sent to a controller for processing to determine the position of the touch.

An array of drive (in one example X) electrodes and sense (in this example Y) electrodes of conductive material can be used to form a touch screen having a plurality of nodes, a node being formed at each intersection of X and Y electrodes. Applying a voltage across the array of electrodes creates a grid of capacitors. When an object touches or is provided in close proximity to the surface of the screen, the capacitance change at every individual point on the grid can be measured to determine the location of the touch.

In recent years, two-dimensional position sensors have been developed. It is desirable for position sensors to be scalable so that they can be used in large screens. In addition, it is desirable for position sensors to be as thin as possible.

SUMMARY

This document discloses systems, methods, and articles of manufactures, related to position sensors and uses therefor. Various patterns of drive electrodes and sense electrodes that can be used in a panel for a position sensor are shown and described. In various examples, the drive electrodes and sense electrodes can be arranged in a grid-like matrix.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

Figure 1:
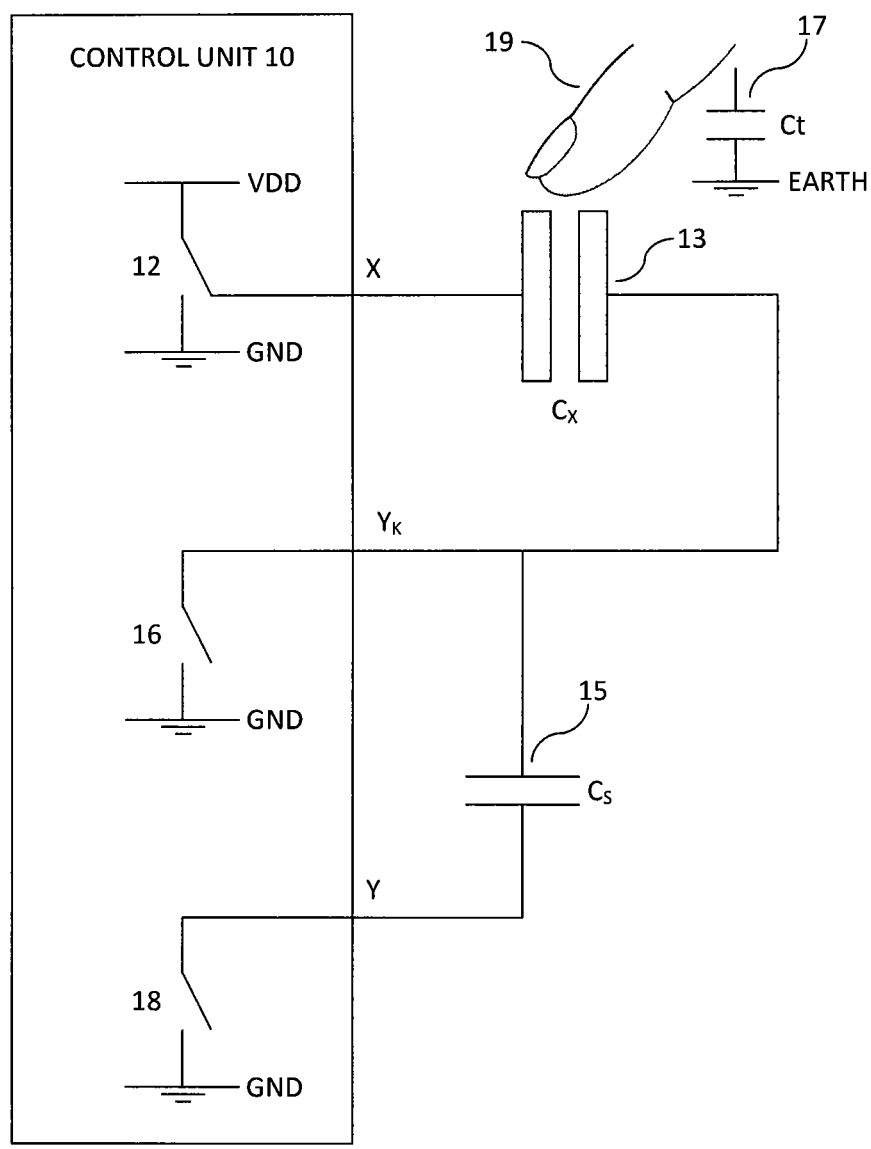
FIG. 1 illustrates schematically an apparatus for detecting a touch.

Reference now is made in detail to the examples illustrated in the accompanying figures and discussed below. FIG. 1 illustrates schematically an apparatus for detecting a touch. The apparatus includes a control unit 10 provided with three switches 12, 16 and 18. Control unit 10 may be a microcontroller, a microprocessor, a programmable logic device/array, an application-specific integrated circuit (ASIC), or a combination thereof. Switch 12 is provided between VDD and ground and is also connected to a sensor 13. The self coupling capacitance of the sensor 13 is $C_X$. The sensor 13 has two electrodes, an X (drive) electrode and a Y (sense) electrode. The apparatus measures the transverse coupling capacitance between the X and Y electrodes.

The sensor 13 is connected in series to a sampling capacitor 15 having a sampling capacitance $C_S$. The sampling capacitor 15 typically has a sampling capacitance CS which is considerably larger than the sensor capacitance $C_X$. In one example, the sampling capacitance $C_S$ is at least 1000 times larger than the sensor capacitance $C_X$, where the sensor capacitance $C_X$ may be around 1 pF to 10 pF. The sampling capacitor 15 is also connected in series to the switches 16 and 18, both of which are connected to ground.

Capacitance C is a measure of the amount of electric charge stored for a given electric potential.

$$C = \frac{Q}{V}$$

Where V is the voltage between the plates and Q is charge.

Figure 2:
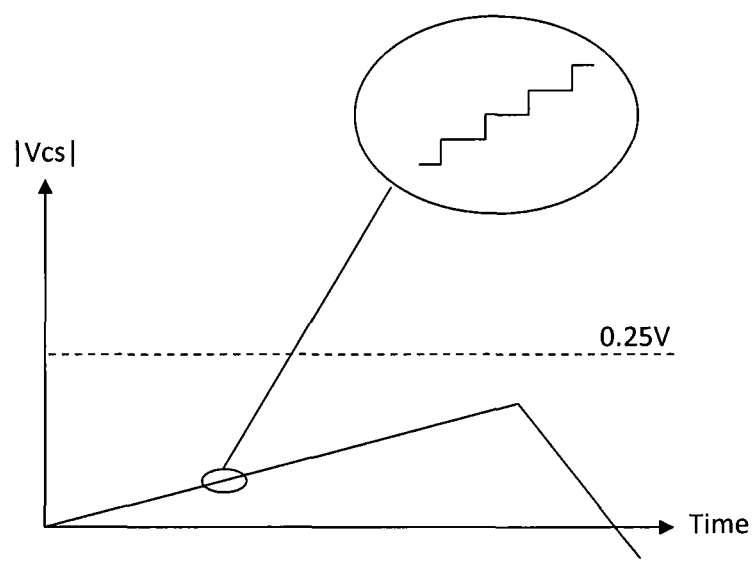
FIG. 2 illustrates the time required to charge and discharge the apparatus of FIG. 1.

After opening switch 16, a voltage pulse is applied to the apparatus, by adjusting switch 12 to connect the sensor 13 to VDD, followed by closing switch 18 which causes charge to flow through $C_X$ into $C_S$, accumulating charge at $C_X$ and $C_S$. The sensor capacitance $C_X$ is then discharged, by, opening switch 18 closing switch 16 and adjusting switch 12 to connect to ground. Since only the sensor capacitance $C_X$ is discharged after each voltage pulse, the capacitance $C_S$ held at the sampling capacitor 15 is increased with each voltage pulse. This step wise increase is illustrated in FIG. 2, where $V_{CS}$ is the voltage accumulated at the sampling capacitor 15.

A predetermined number of voltage pulses is applied to the apparatus. After the predetermined number of pulses is applied to the apparatus, the capacitance $C_S$ accumulated in the sampling capacitor 15 is discharged. The time taken for the capacitance to discharge to a reference voltage is measured.

Figure 3:
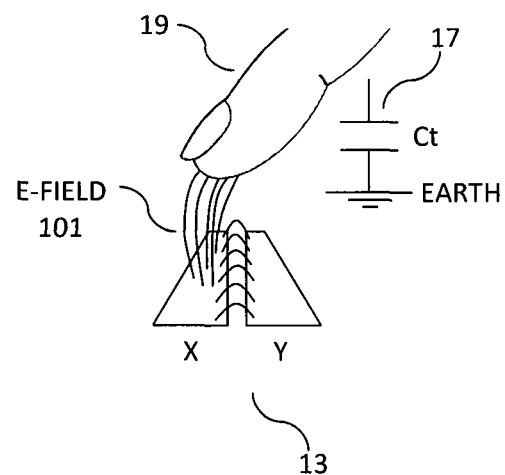
FIG. 3 illustrates changes in an electric field when a finger is present.

As illustrated in FIG. 3, when a user's finger 19, which has a touch capacitance to Earth $C_f$, is moved close to (or contacts) the sensor 13, it diverts charge away from the drive electrode of $C_X$ to earth so that the capacitance $C_S$ accumulated in the sampling capacitor 15 with each voltage pulse is reduced. In one example, the sensor 13 is provided behind a dielectric panel so the finger 19 does not directly contact the sensor 13. In another example, or in addition to a dielectric panel, the finger 19 may be provided in close proximity to the sensor 13, but not directly contacting the sensor 13.

Figure 4A:
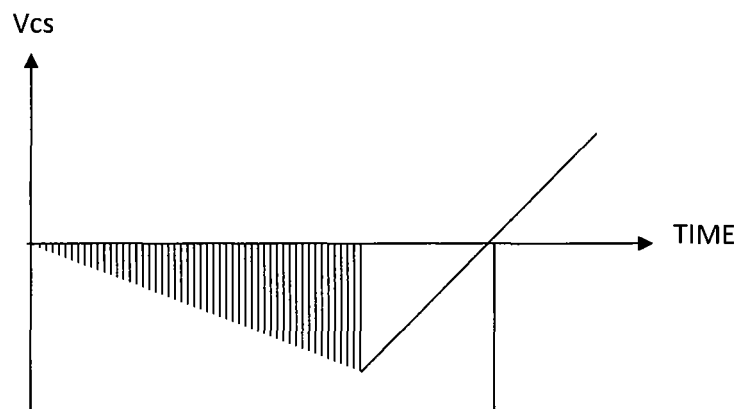
FIG. 4A illustrates the time required to charge and discharge the apparatus of FIG. 1, when there is no touch.
Figure 4B:
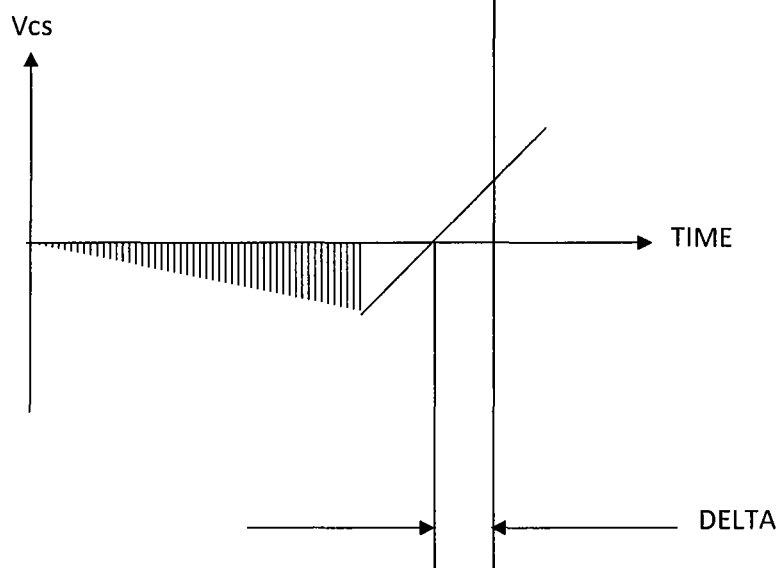
FIG. 4B illustrates the time required to charge and discharge the apparatus of FIG. 1, when there is a touch.

FIG. 4A illustrates the voltage $V_{CS}$ accumulated at the sampling capacitor 15 after the predetermined number of pulses when there is no touch, and the time required to discharge the sampling capacitor 15. FIG. 4B illustrates the voltage $V_{CS}$ accumulated at the sampling capacitor 15 after the predetermined number of pulses when a user's finger 19 is close to the sensor 13 (i.e. when there is a touch), and the time required to discharge the sampling capacitor 15. Since the sampling capacitor 15 is connected to the negative side of the sensor 13, in the example, the accumulated voltage $V_{CS}$ has a negative value.

As can be seen from FIGS. 4A and 4B, the voltage $V_{CS}$ accumulated in FIG. 4B is reduced when compared to the voltage $V_{CS}$ accumulated in FIG. 4A. In addition, the time required to discharge the sampling capacitor 15 in FIG. 4B is reduced when compared to the time required to discharge the sampling capacitor 15 in FIG. 4A. The reduction in time required to discharge the sampling capacitor 15 in FIG. 4B indicates that there is a touch. The difference between the time required to discharge the sampling capacitor 15 when there is no touch (illustrated in FIG. 4A) and the time required to discharge the sampling capacitor when there is a touch (illustrated in FIG. 4B) is referred to as a delta.

The detection of a delta indicates a touch, because it indicates that there has been a change of charge accumulated at the sampling capacitor 15, when compared to the amount of charge expected to be accumulated at the sampling capacitor 15 when there is no touch.

Figure 5:
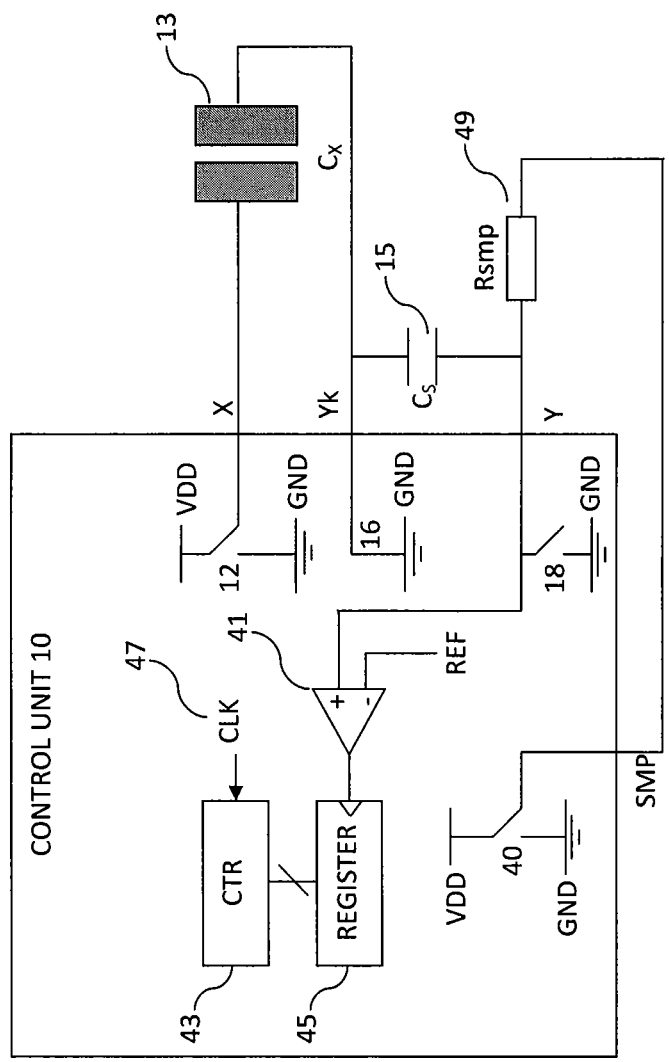
FIG. 5 illustrates schematically a basic measurement circuit.

FIG. 5 illustrates a basic circuit for measuring the magnitude of Vcs. The control unit 10 of FIG. 1 includes a resistor 49, switch 40, a comparator 41, a register 45, a counter 43 and a clock signal 47. The resistor 49, comparator 41 and counter 43 are used to measure the magnitude of Vcs. The time required to discharge the sampling capacitor to a reference voltage is measured with the counter and the comparator, such that the counter value is the measurement.

Figure 6:
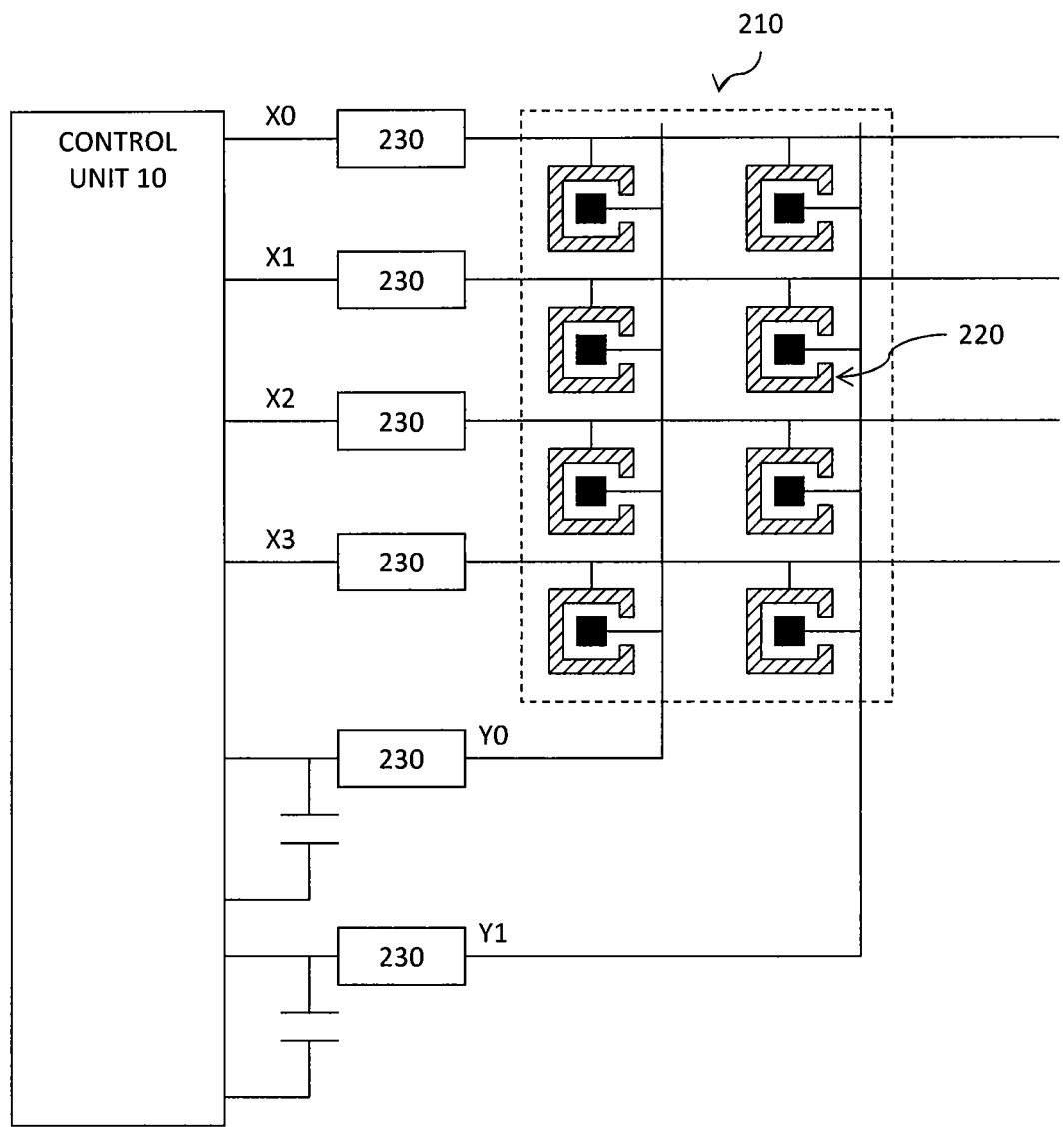
FIG. 6 illustrates schematically a plurality of nodes.

As illustrated in FIG. 6, in order to create a position sensor having more than one touch sensor 13, a plurality of drive and sense electrodes can be provided to create an array of sensing elements 220 (touch sensors 13) within a panel 210 of the position sensor. The drive electrodes (X) form one plate of each sensor 13 and the sense (Y) electrodes form the other plate of each sensor 13 having a capacitance $C_X$. The position sensor also includes a plurality of resistors 230, which may have different values, and a control unit 10. FIG. 6, illustrates one exemplary matrix of eight sensing elements 220, however many other configurations are possible.

The matrix of drive and sense electrodes forms a two-dimensional position sensor capable of sensing the position of a touch. The control unit 10 uses a scanning sequence through the rows of drive electrodes and the columns of sense electrodes to measure coupling capacitance at the intersections or nodes. Examples of position sensors include touch screens and touch pads, which can be provided attached to or as part of computers, personal digital assistants (PDAs), satellite navigation devices, mobile phones, portable media players, portable game consoles, public information kiosks, point of sale systems, and the like. Position sensors can also be used as control panels on various appliances.

Figure 7:
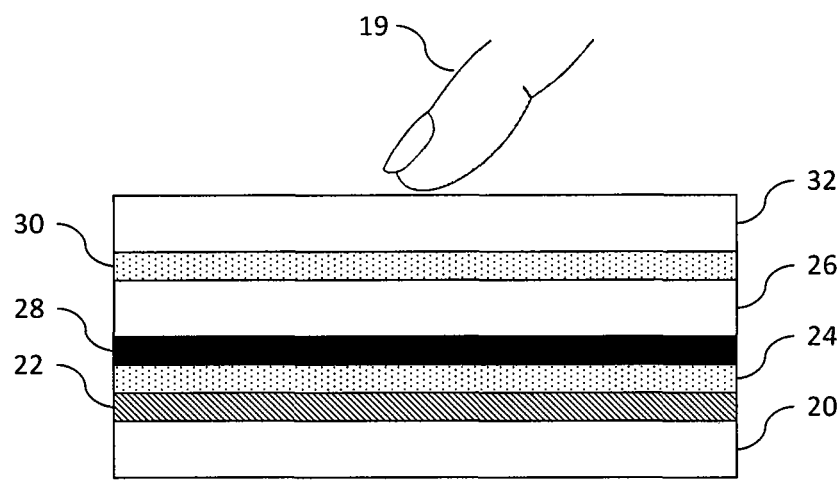
FIG. 7 illustrates schematically an exemplary construction of a panel.

FIG. 7 illustrates a mechanical stack arrangement which can be used to manufacture an exemplary panel for a position sensor. The stack includes a lower substrate 20; drive electrodes 22; an adhesive layer 24; sense electrodes 28; an upper substrate 26; an adhesive layer 30 and a front panel 32. In one example, the drive electrode 22 is the X electrode and the sense electrode 28 is the Y electrode. In one example, the lower substrate 20 and the upper substrate 26 are polyethylene terephthalate (PET), and the drive and sense electrodes 22, 28 are indium tin oxide (ITO). In one example, the adhesive of layers 24, 30 is an optically clear adhesive.

In one example, the drive electrodes 22 are fabricated on the lower substrate 20 and the sense electrodes 28 are fabricated on the upper substrate 26. Although the drive electrodes 22 and the sense electrodes 28 are separated by an adhesive layer 24, the drive and sense electrodes 22, 28 are fabricated such that when provided in the stack arrangement the two electrode layers 22, 28 do not overlap substantially.

Figure 8A:
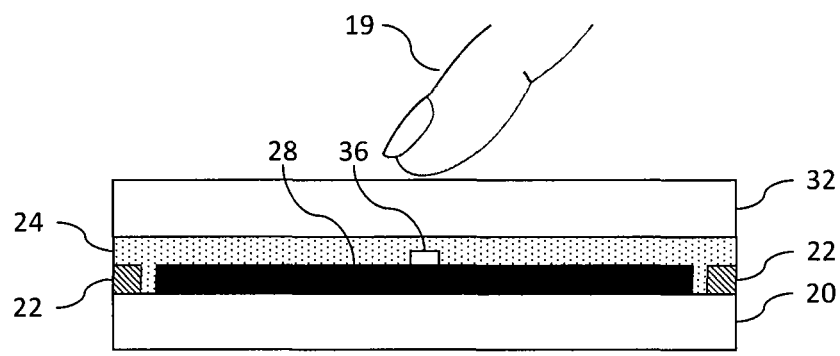
FIG. 8A illustrates schematically another exemplary construction of a panel.

FIG. 8A illustrates another stack arrangement which can be used to manufacture a panel for a position sensor where the drive and sense electrodes 22, 28 are provided on a single layer. Crossovers 36 are used at the point of intersection of the drive and sense electrodes with a dielectric insulator to prevent shorting. The stack includes a substrate 20; a drive electrodes 22; a sense electrodes 28; a crossover 36; an adhesive layer 24 and a front panel 32. In one example, the drive electrode 22 is the X electrode and the sense electrode 28 is the Y electrode. In one example, the substrate 20 is PET, and the drive and sense electrodes 22, 28 are ITO. In another example, the substrate 20 is glass. The adhesive of layer 24 is an optically clear adhesive.

Figure 8B:
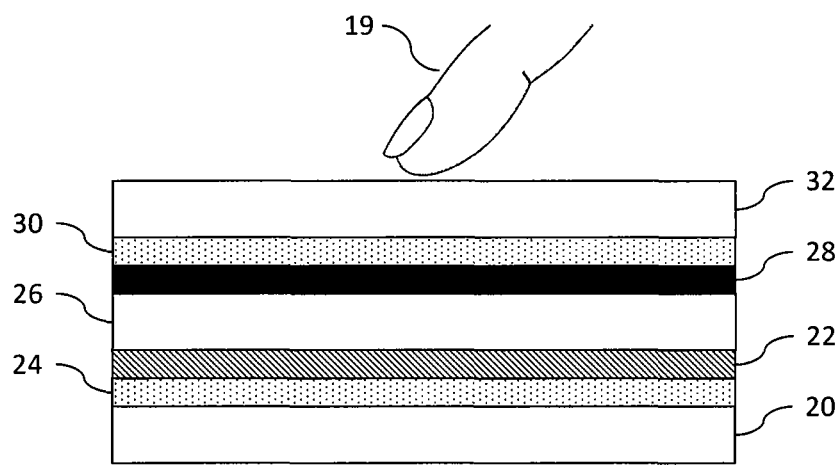
FIG. 8B illustrates schematically another exemplary construction of a panel.

FIG. 8B illustrates another stack arrangement which can be used to manufacture a panel for a position sensor where the drive and sense electrodes 22, 28 are provided on either side of the upper substrate 26. Although the drive electrode 22 and the sense electrode 28 are separated by the upper substrate 26, the drive and sense electrodes 22, 28 are fabricated such that when provided in the stack arrangement the two electrode layers 22, 28 do not overlap substantially.

In the examples of FIGS. 7, 8A and 8B, the drive electrodes 22 are not provided directly behind the sense electrodes 28 in the stack arrangements, such that the sense electrodes 28 do not overlap the drive electrodes 22, except at the intersections. In addition, the drive and sense electrodes do not contact each other.

In one example, the drive and sense electrodes 22, 28 are provided as one layer of ITO. In one example, the ITO layer is on the substrate.

In one example, the adhesive layers of FIGS. 7, 8A and 8B are as thin as possible.

In one example, the sense electrodes, as opposed to the drive electrodes, are provided on the side nearest the touch represented with a user's finger 19 in FIGS. 7 and 8.

In one example, the substrates 20, 26 are an insulating material. In another example, the substrates 20, 26 are made of materials, such as PCB materials (FR4, CEM-1, polyamide and Kapton), acrylics like PET or polycarbonate. Glass can also be used.

In one example, the electrodes 22, 28 may be copper, carbon, silver ink, ORGACON or ITO. In one example, the material of each of the electrodes 22, 28 has a low resistivity. In another example, the material of each of the electrodes 22, 28 has a resistivity of less than 1 K$\Omega$/sq.

In one example, the front panel 32 may be glass, Plexiglas, polycarbonates, or PMMA.

In the examples of FIGS. 7, 8A and 8B, typically the drive electrodes 22 are larger (have a larger surface area) than the sense electrodes 28. In one example, each sense electrode 28 is between 0.1 mm and 0.5 mm wide. In one example, each drive electrode 22 is larger than a sense electrode 28 by around 0.2 mm on all sides.

Figure 9A:
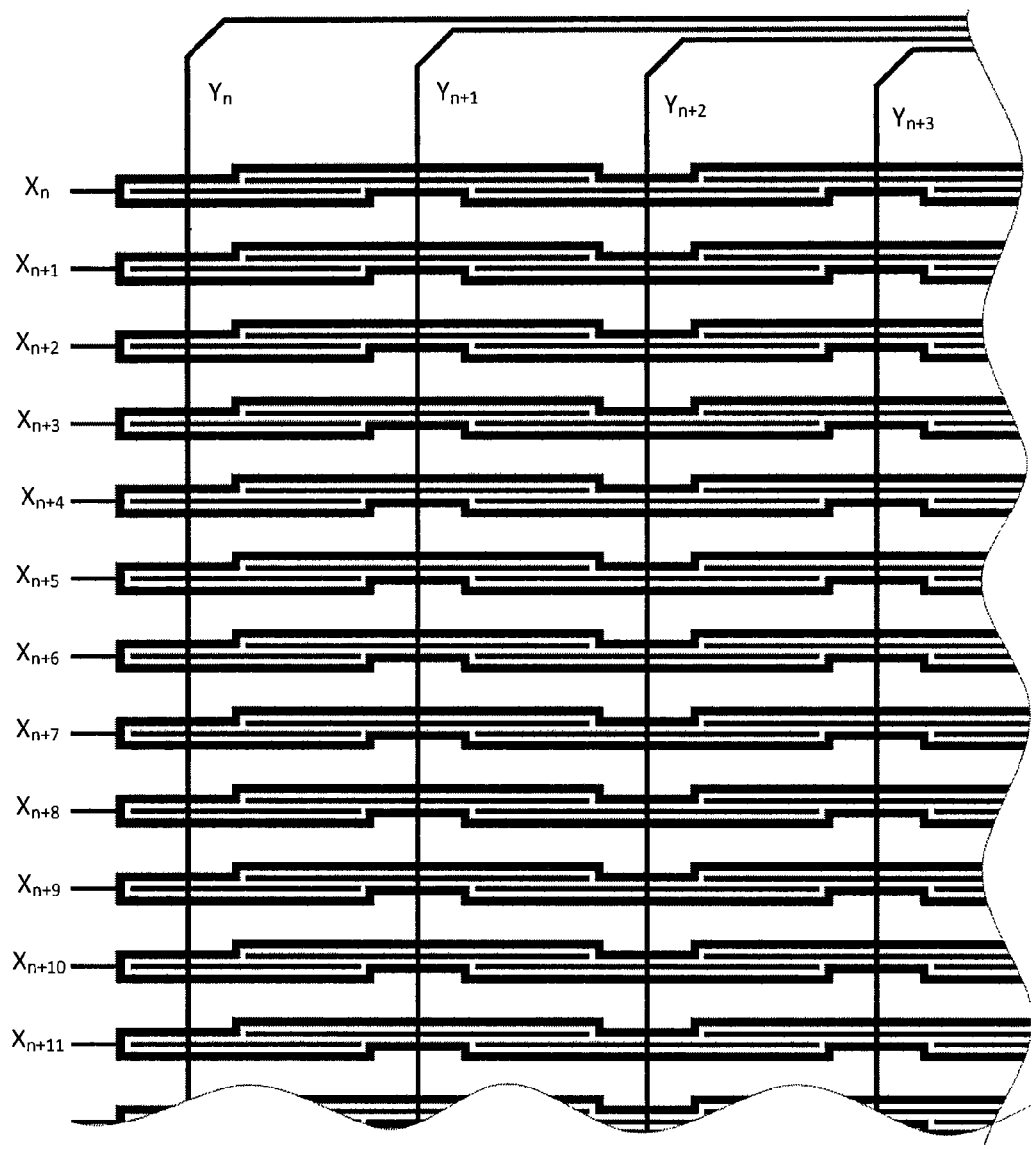
FIG. 9A illustrates schematically one exemplary arrangement of drive and sense electrodes of a panel.

FIG. 9A illustrates a first exemplary composite electrode pattern of drive and sense electrodes providing a panel of a position sensor. The drive and sense electrodes form a grid-like matrix. The drive electrodes are the thicker lines that extend substantially horizontally, in a first position sensing direction, across the page of FIG. 9A. The sense electrodes are the thinner lines that extend substantially vertically, in a second position sensing direction, down the page, substantially perpendicular to the drive electrodes, and the thinner overlapping lines that extend across the page of FIG. 9A, in the first position sensing direction. The sense electrodes which extend in the first position sensing direction are surrounded by the drive electrodes.

Figure 11:
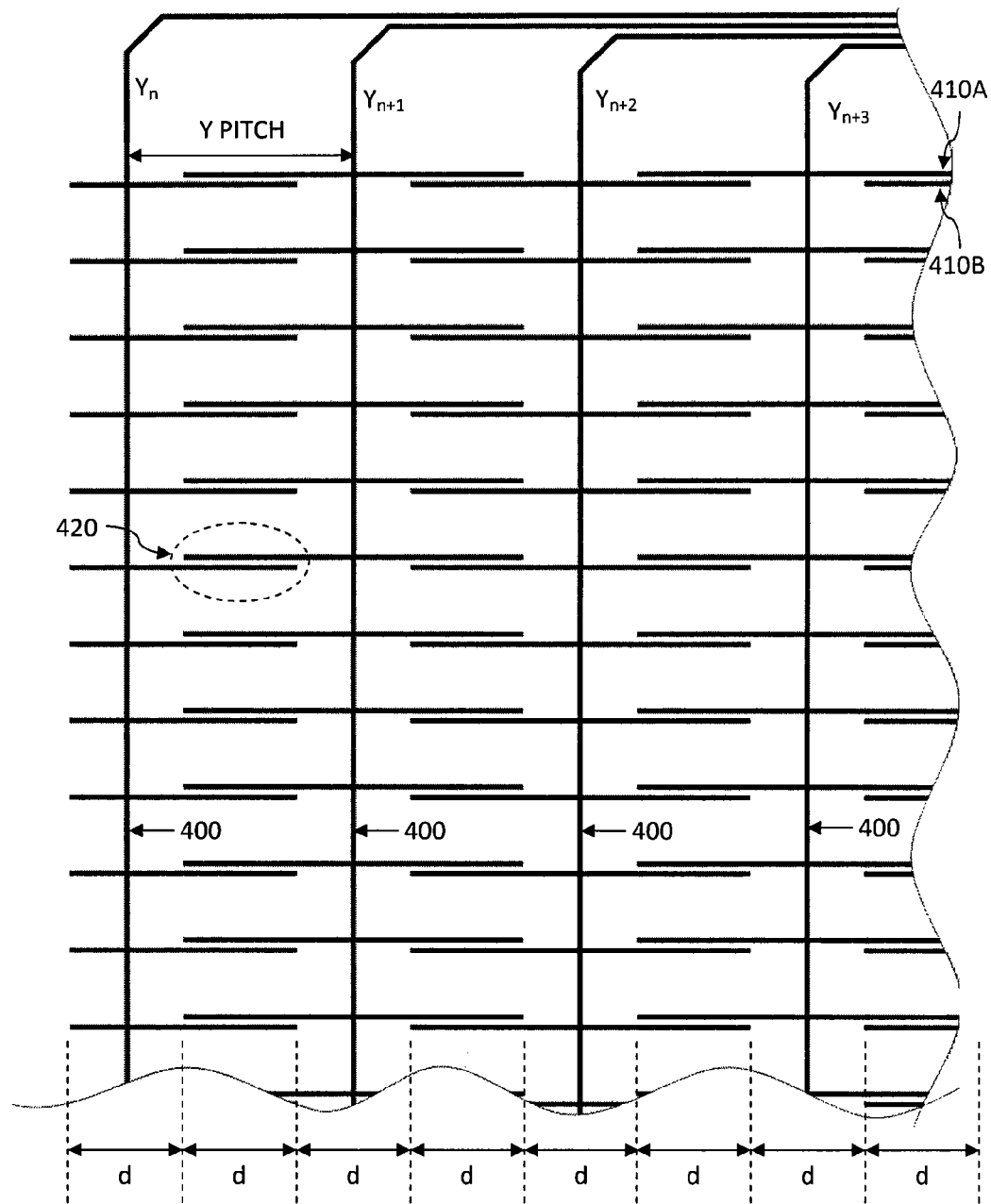
FIG. 11 illustrates schematically the sense electrodes of the panel of FIG. 9A and/or the panel of FIG. 9B and/or the panel of FIG. 10.

FIG. 11 illustrates the sense electrodes of the first electrode pattern illustrated in FIG. 9A. As illustrated in FIGS. 9A and 11, the sense electrodes include first sense elements 400 that extend substantially vertically, and second sense elements 410A, 410B that extend substantially horizontally, substantially perpendicular to the first sense elements 400. Each second sense element 410A, 410B intersects one first sense element 400. The second sense elements 410A, 410B are arranged to provide a non-contact overlap 420 between two second sense elements 410A, 410B. The overlap 420 is situated between two first sense elements 400. The length of each overlap d is illustrated in FIG. 11. The second sense elements 410A, 410B overlap by substantially the same amount.

The first sense elements 400 and the second sense elements 410A, 410B are electrically connected to sense channels Yn, Yn+1, Yn+2, . . . in FIGS. 9A and 11. As stated above, areas of the sense elements 400, 410A, 410B are surrounded by the drive electrodes.

The second sense elements 410A, 410B enable the Y pitch, which is the distance between the centers of two adjacent first sense elements 400, illustrated in FIG. 11, to be increased. This is because the second sense elements 410A, 410B spatially interpolate the electric field distribution.

In one example, the width of the second sense elements 410A, 410B is substantially half the width of the first sense elements 400.

Figure 12A:
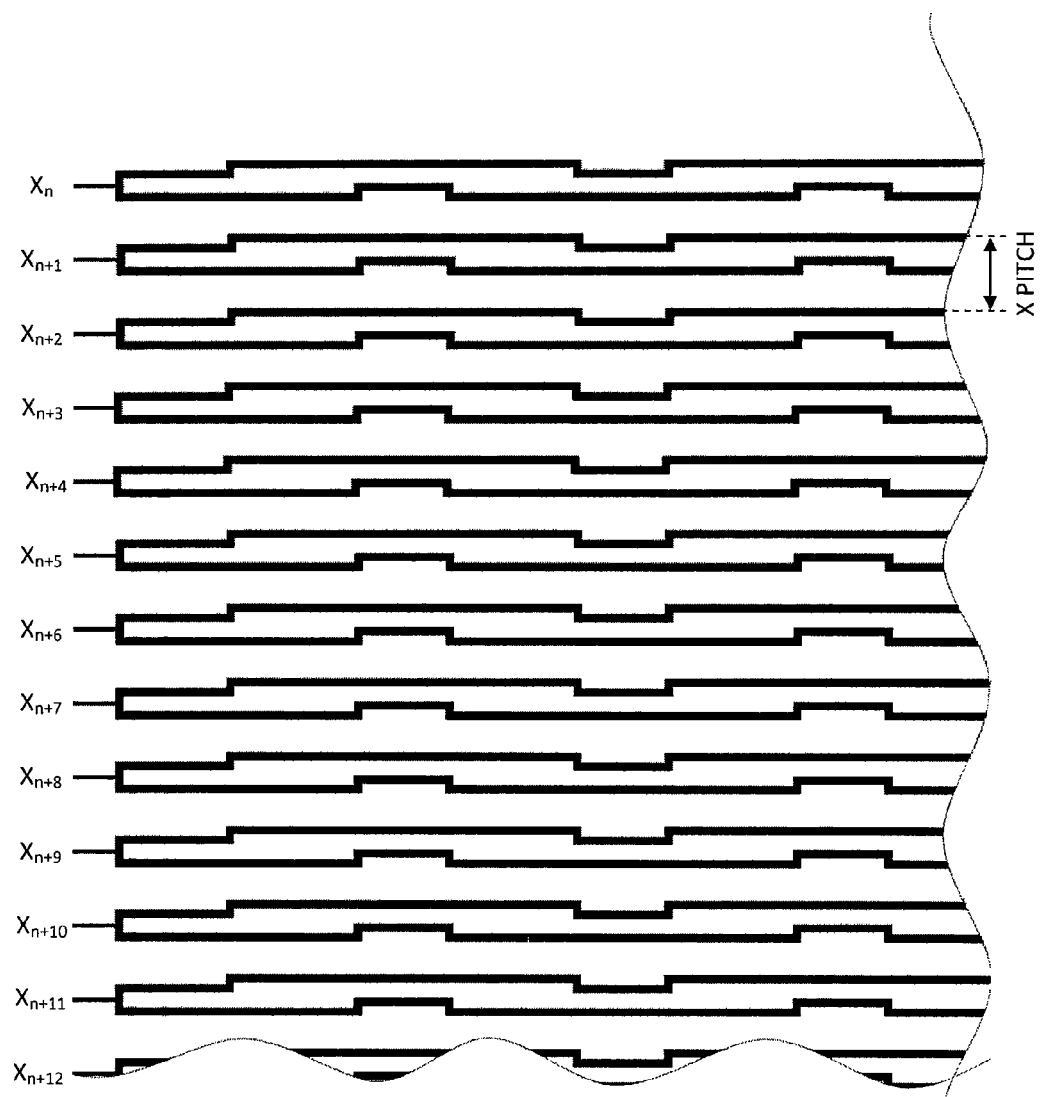
FIG. 12A illustrates schematically the drive electrodes of the panel of FIG. 9A.

FIG. 12A illustrates the drive electrodes of the first composite electrode pattern illustrated in FIG. 9A. The drive electrodes are connected to drive channels Xn, Xn+1, Xn+2, . . . in FIGS. 9A and 12A. The X pitch, which is the distance between the top of a first drive electrode and the top of a second, adjacent, drive electrode, is illustrated in FIG. 12A, and is equivalent to the distance between the center of first drive electrode and the center of second, adjacent, drive electrode.

Each drive electrode illustrated in FIGS. 9A and 12A surrounds a row of second sensing elements.

Figure 9B:
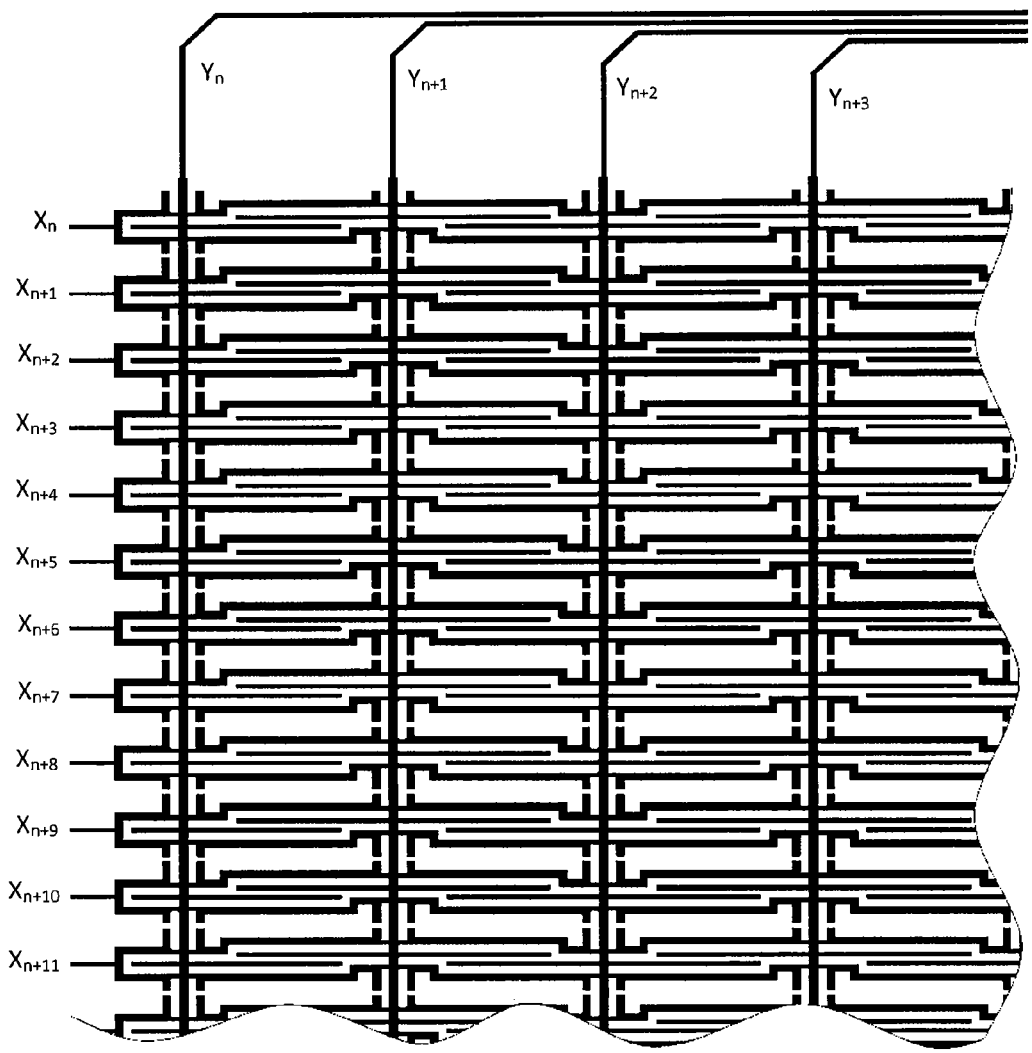
FIG. 9B illustrates schematically another exemplary arrangement of drive and sense electrodes of a panel.

FIG. 9B illustrates a second exemplary composite electrode pattern of drive and sense electrodes providing a panel of a position sensor. The drive and sense electrodes form a grid-like matrix. The drive electrodes are the thicker lines that extend substantially horizontally, in a first position sensing direction, across the page of FIG. 9B, and the thicker lines that extend substantially vertically, in a second position sensing direction, down the page of FIG. 9B, substantially perpendicular to the first position sensing direction. The sense electrodes are the thinner lines that extend substantially vertically, in the second position sensing direction, down the page, and the thinner overlapping lines that extend across the page of FIG. 9B, in the first position sensing direction. The sense electrodes that extend in the first and second position sensing directions are surrounded by the drive electrodes.

FIG. 11 illustrates the sense electrodes of the second electrode pattern illustrated in FIG. 9B. As illustrated in FIGS. 9B and 11, the sense electrodes include first sense elements 400 that extend substantially vertically, and second sense elements 410A, 410B that extend substantially horizontally, substantially perpendicular to the first sense elements 400. Each second sense element 410A, 410B intersects one first sense element 400. The second sense elements 410A, 410B are arranged to provide a non-contact overlap 420 between two second sense elements 410A, 410B. The overlap 420 is situated between two first sense elements 400. The length of each overlap d is illustrated in FIG. 11. The second sense elements 410A, 410B overlap by the same amount.

The first sense elements 400 and the second sense elements 410A, 410B are electrically connected to sense channels Yn, Yn+1, Yn+2, . . . in FIGS. 9B and 11. As stated above, areas of the sense elements 400, 410A, 410B are surrounded by the drive electrodes 500, 510A, 50B.

The second sense elements 410A, 410B enable the Y pitch, which is the distance between the centers of two adjacent first sense elements 400, illustrated in FIG. 11, to be increased. This is because the second sense elements 410A, 410B spatially interpolate the electric field distribution.

In one example, the width of the second sense elements 410A, 410B is substantially half the width of the first sense elements 400.

Figure 12B:
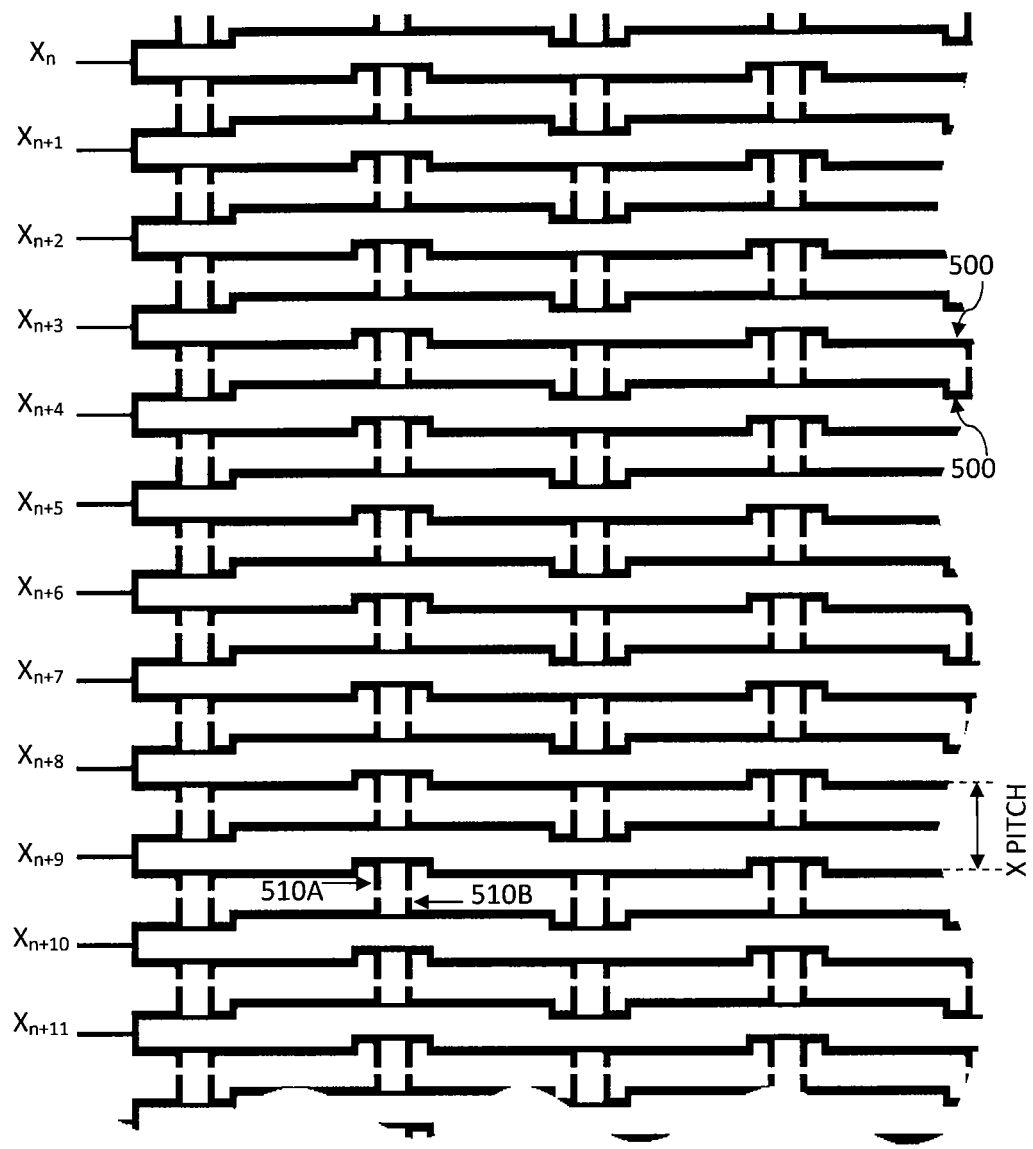
FIG. 12B illustrates schematically the drive electrodes of the panel of FIG. 9B.

FIG. 12B illustrates the drive electrodes of the second composite electrode pattern illustrated in FIG. 9B. The drive electrodes are connected to drive channels Xn, Xn+1, Xn+2, . . . in FIGS. 9B and 12B. The X pitch, which is the distance between the top of a first drive electrode and the top of a second, adjacent, drive electrode, is illustrated in FIG. 12B, and is equivalent to the distance between the center of first drive electrode and the center of second, adjacent, drive electrode.

As illustrated in FIGS. 9B and 12B, the drive electrodes include first drive elements 500 that extend substantially horizontally, in a first position sensing direction, across the page of FIG. 12B, and second drive elements 510A, 510B that extend substantially vertically, in a second position sensing direction, down the page of FIG. 9B, substantially perpendicular to the first position sensing direction. Each set of second drive elements 510A, 510B are provided to surround the first sense elements 400.

Each drive electrode illustrated in FIGS. 9B and 12B surrounds a row of first and second sensing elements.

Figure 10:
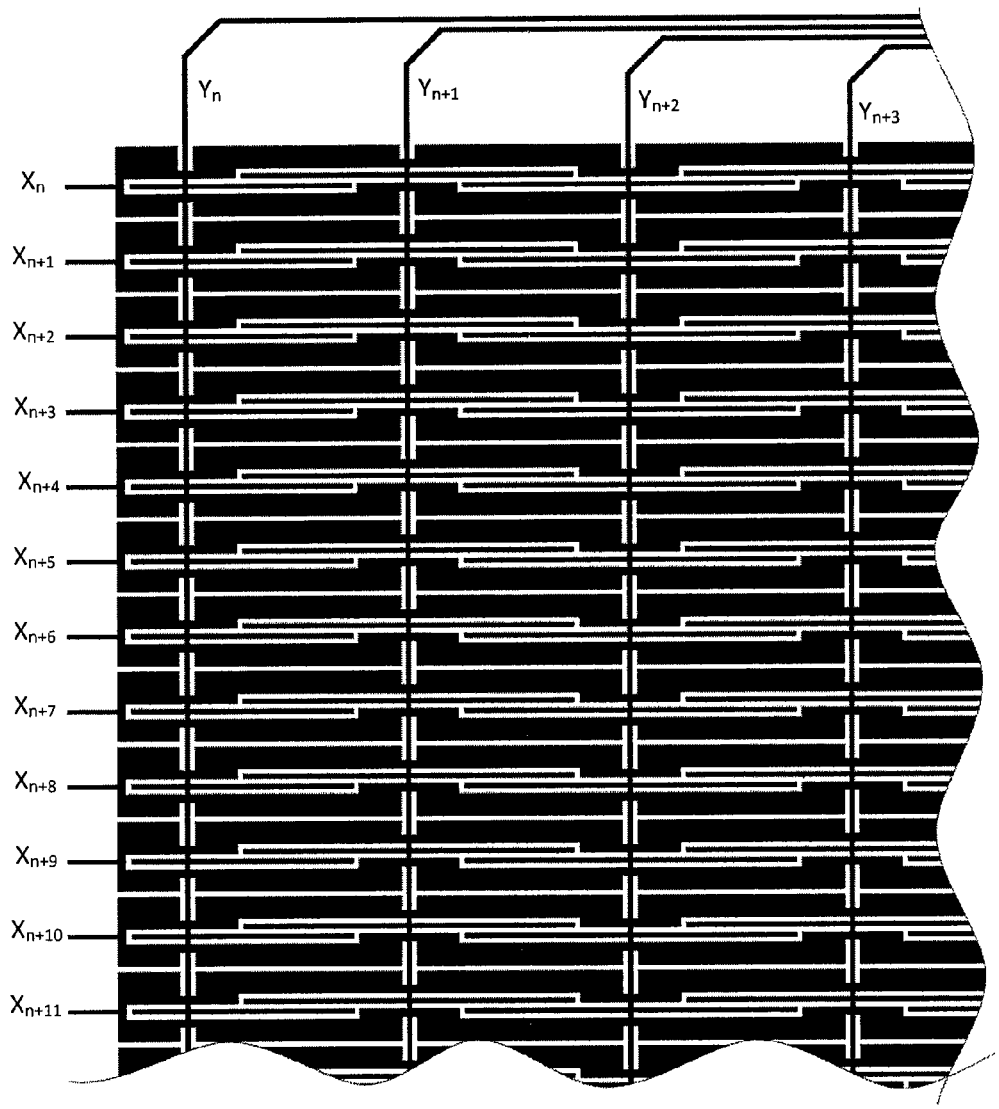
FIG. 10 illustrates schematically another exemplary arrangement of drive and sense electrodes of a panel.

FIG. 10 illustrates a third exemplary composite electrode pattern of drive and sense electrodes providing a panel of a position sensor. The drive and sense electrodes form a grid-like matrix. The drive electrodes are the thicker lines that extend substantially horizontally, in a first position sensing direction, across the page of FIG. 10. The sense electrodes are the thinner lines that extend substantially vertically, in a second position sensing direction, down the page, substantially perpendicular to the drive electrodes, and the thinner overlapping lines that extend across the page of FIG. 10, in the first position sensing direction. The sense electrodes are surrounded by the drive electrodes.

FIG. 11 illustrates the sense electrodes of the third electrode pattern illustrated in FIG. 10. As illustrated in FIGS. 10 and 11, the sense electrodes include first sense elements 400 that extend substantially vertically, and second sense elements 410A, 410B that extend substantially horizontally, substantially perpendicular to the first sense elements 400. Each second sense element 410A, 410B intersects one first sense element 400. The second sense elements 410A, 410B are arranged to provide a non-contact overlap 420 between two second sense elements 410A, 410B. The overlap 420 is situated between two first sense elements 400. The length of each overlap d is illustrated in FIG. 11. The second sense elements overlap 410A, 410B by the same amount.

The first sense elements 400 and the second sense elements 410A, 410B are electrically connected to sense channels Yn, Yn+1, Yn+2, . . . in FIGS. 10 and 11. As stated above, the sense elements 400, 410A, 410B are surrounded by the drive electrodes.

The second sense elements 410A, 410B enable the Y pitch, which is the distance between the centers of two adjacent first sense elements 400, illustrated in FIG. 11, to be increased. This is because the second sense elements 410A, 410B spatially interpolate the electric field distribution.

In one example, the width of the second sense elements is substantially half the width of the first sense elements.

Figure 13:
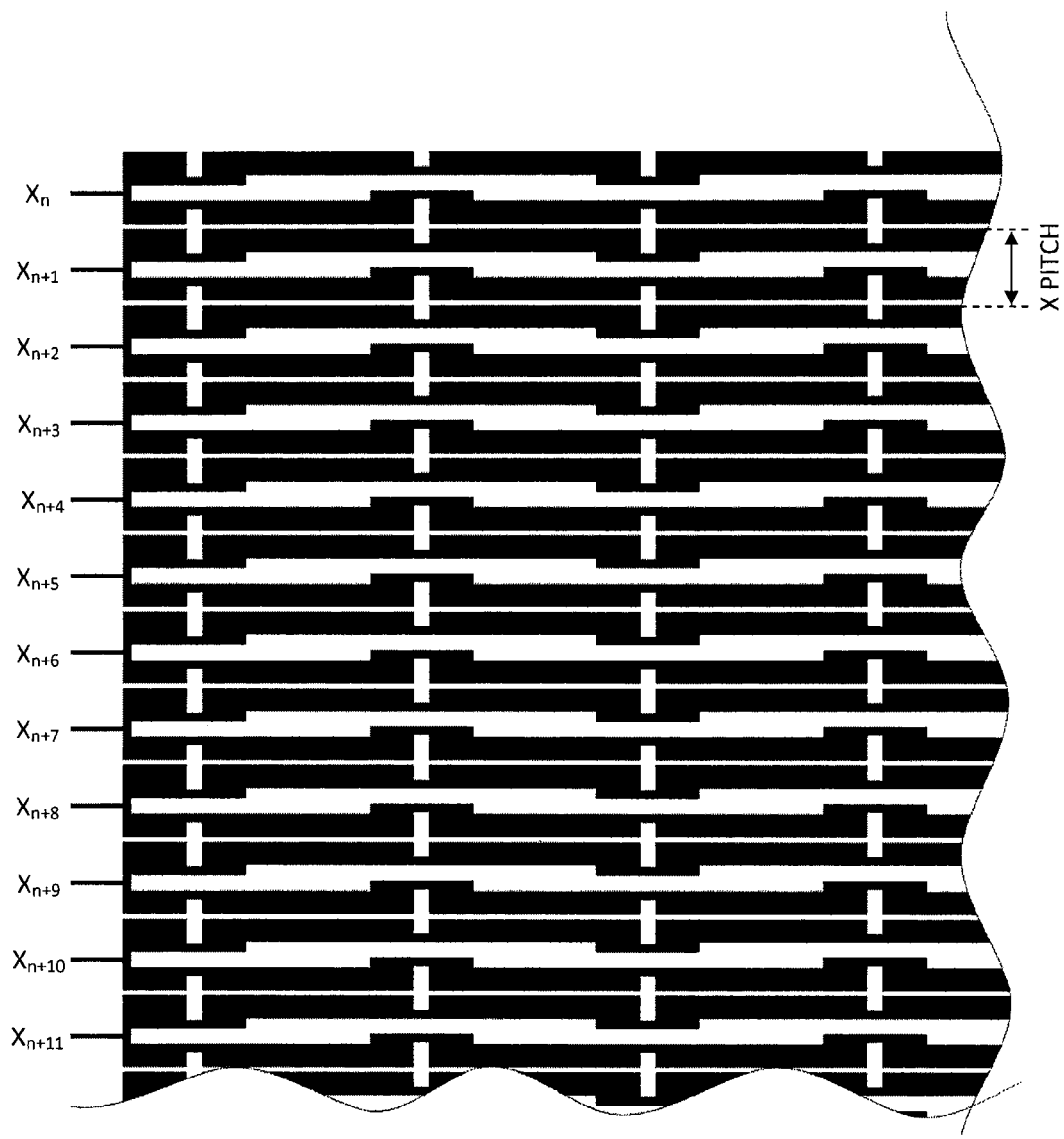
FIG. 13 illustrates schematically the drive electrodes of the panel of FIG. 10.

FIG. 13 illustrates the drive electrodes of the third electrode pattern illustrated in FIG. 10. The drive electrodes are connected to drive channels Xn, Xn+1, Xn+2, . . . in FIGS. 10 and 13. The X pitch, which is the distance between the top of a first drive electrode and the top of a second, adjacent, drive electrode, is illustrated in FIG. 13, and is equivalent to the distance between the center of a first drive electrode and the center of a second, adjacent, drive electrode.

Each drive electrode illustrated in FIGS. 10 and 13 surrounds a row of first and second sensing elements.

Figure 14A:
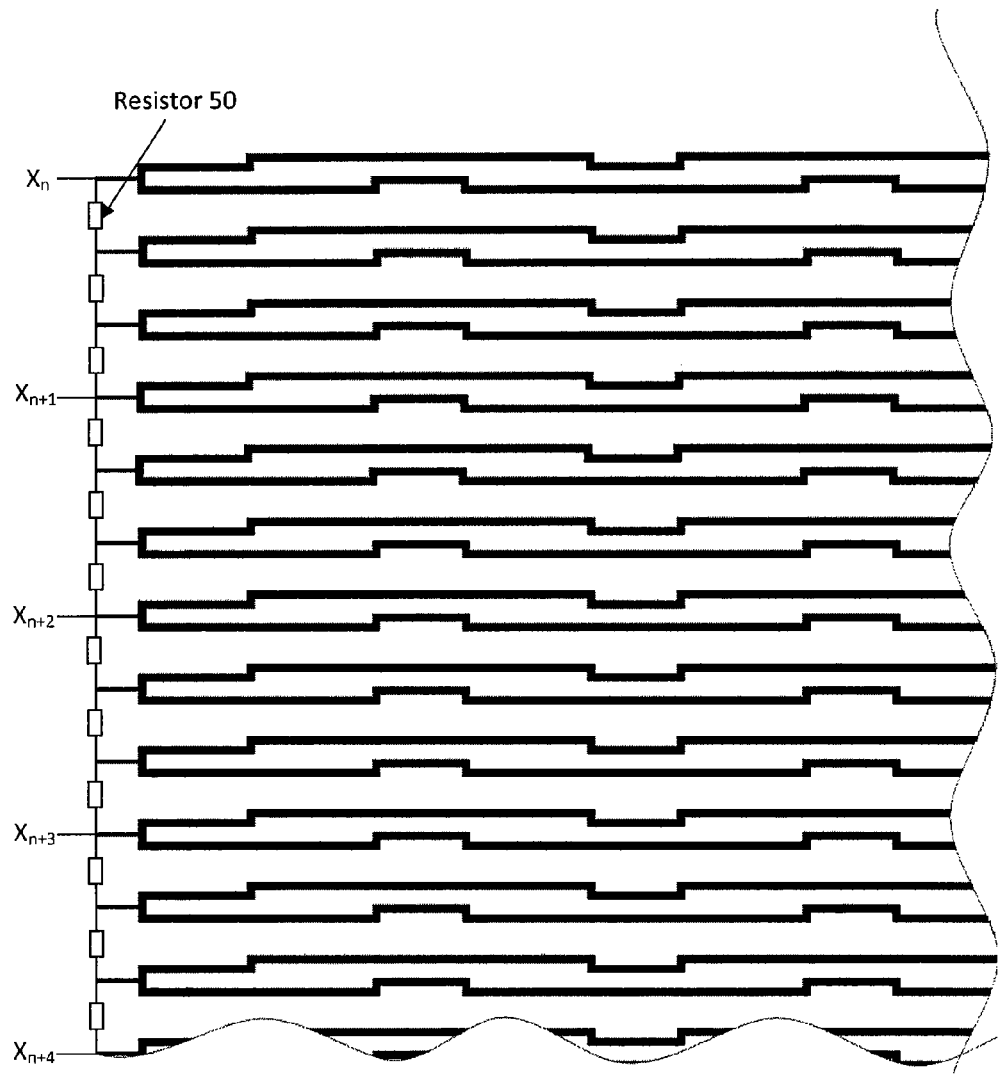
FIG. 14A illustrates schematically the drive electrodes of the panel of FIG. 9A with resistive interpolation.

FIG. 14A illustrates the drive electrodes of the first electrode pattern, illustrated in FIGS. 9A and 12A, arranged for resistive interpolation. Each drive electrode is coupled to its adjacent drive electrodes by a resistor 50. Each drive channel Xn, Xn+1, Xn+2, . . . provides drive signals to a group of five drive electrodes, except for the top edge and bottom edge drive channels (Xn or Xn+4 illustrated in FIG. 14A), which supplies three drive electrodes. However, the interpolation might be over any number of electrodes, and is not limited to five electrodes. In this arrangement fewer drive channels are required, when compared to the electrode pattern of FIG. 12A. As one X channel is driven at a time while all other X channels are grounded, the resistors 50 form a resistive ladder and hence provide the X electrodes with fractional amplitudes of the drive signal. Although FIG. 14A illustrates the resistors 50 being provided on the left hand side of the panel, the resistors 50 may be provided on the right hand side of the panel or on both sides of the panel.

Figure 14B:
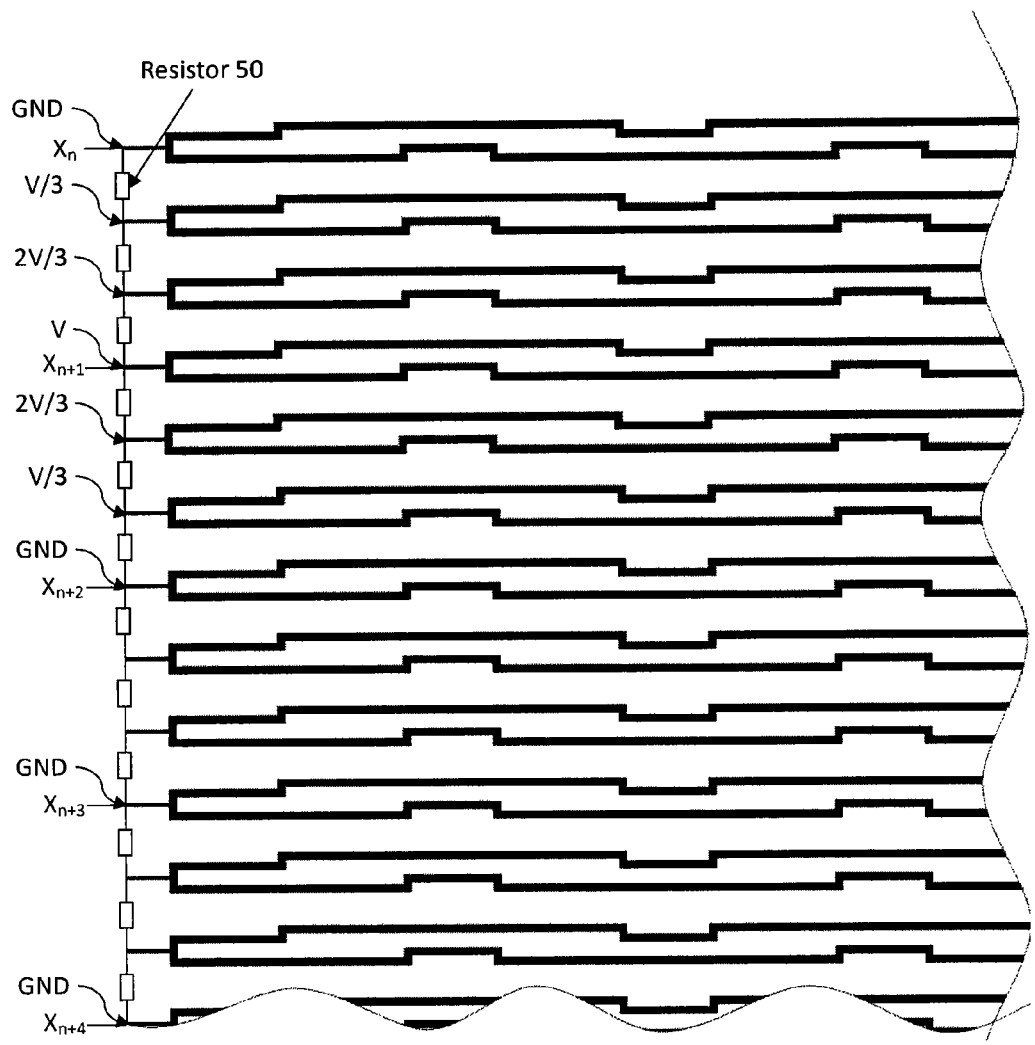
FIG. 14B illustrates schematically the drive electrodes of the panel of FIG. 9A with resistive interpolation.

FIG. 14B illustrates in further detail the resistive interpolation illustrated in FIG. 14A. In FIG. 14B the drive channel Xn+1 is being driven. When one drive channel is being driven, all of the other drive channels (Xn, Xn+2, Xn+3, Xn+4 in FIG. 14B) are grounded. A voltage V is applied to the drive electrode connected to the drive channel Xn+1. The resistors 50 create a ladder going up to Xn and down to Xn+2. A voltage 2V/3 is applied to the drive electrodes provided adjacent to the drive channel Xn+1, and a voltage V/3 is applied to the drive electrodes provided adjacent but one to the drive channel Xn+1. The amount of voltage applied to each drive electrode is a ratio of the number of drive electrodes being driven.

Figure 15:
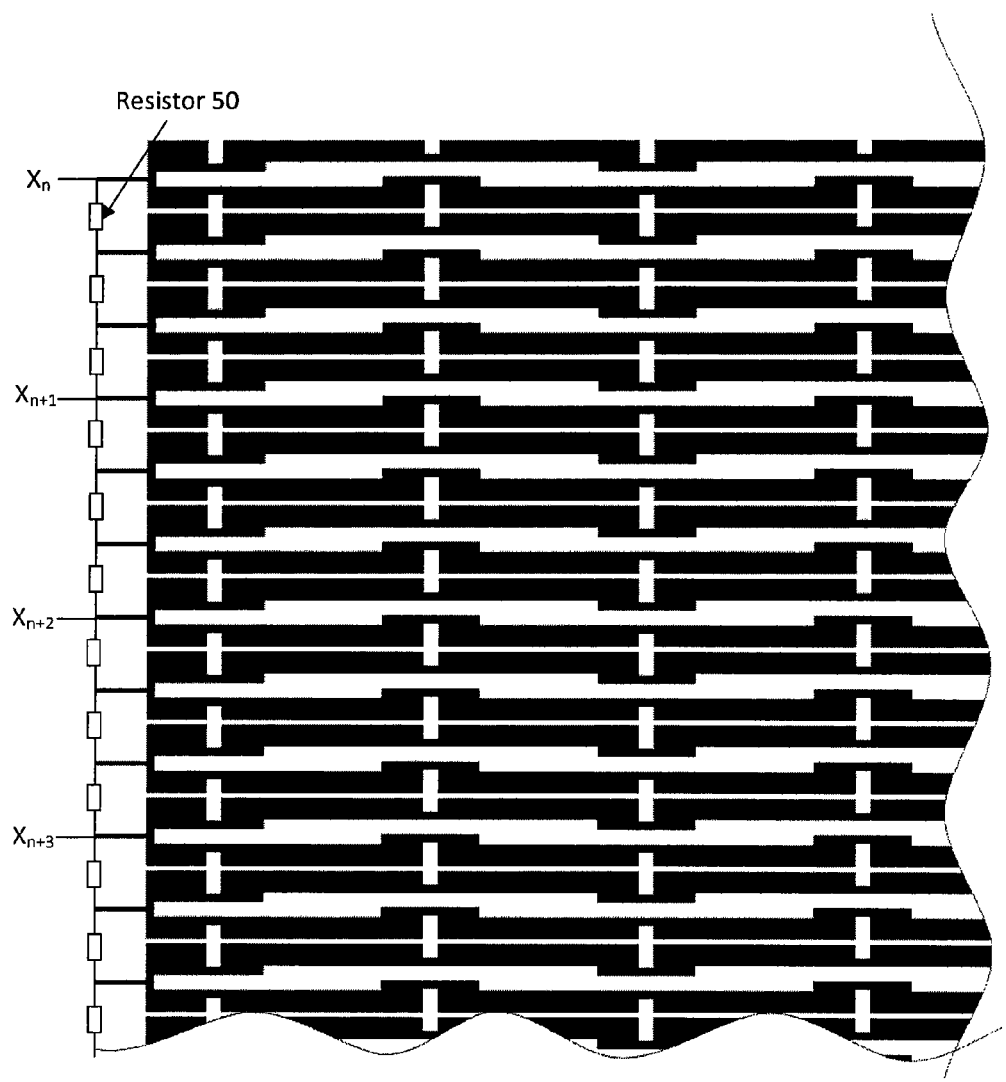
FIG. 15 illustrates schematically the drive electrodes of the panel of FIG. 10 with resistive interpolation.

FIG. 15 illustrates the drive electrodes of the third electrode pattern illustrated in FIGS. 10 and 13 arranged for resistive interpolation. Each drive electrode is coupled to its adjacent drive electrodes by a resistor 50. Each drive channel Xn, Xn+1, Xn+2, . . . provides drive signals to a group of five drive electrodes, except for the top edge and bottom edge drive channels (the top edge drive channel Xn is illustrated in FIG. 15), which supplies three drive electrodes. However, the interpolation might be over any number of electrodes, and is not limited to five electrodes. In this arrangement fewer drive channels are required, when compared to the electrode pattern of FIG. 13. As one X channel is driven at a time while all other X channels are grounded, the resistors 50 form a resistive ladder and hence provide the X electrodes with fractional amplitudes of the drive signal. Although FIG. 15 illustrates the resistors 50 being provided on the left hand side of the panel, the resistors 50 may be provided on the right hand side of the panel or on both sides of the panel.

Figure 16:
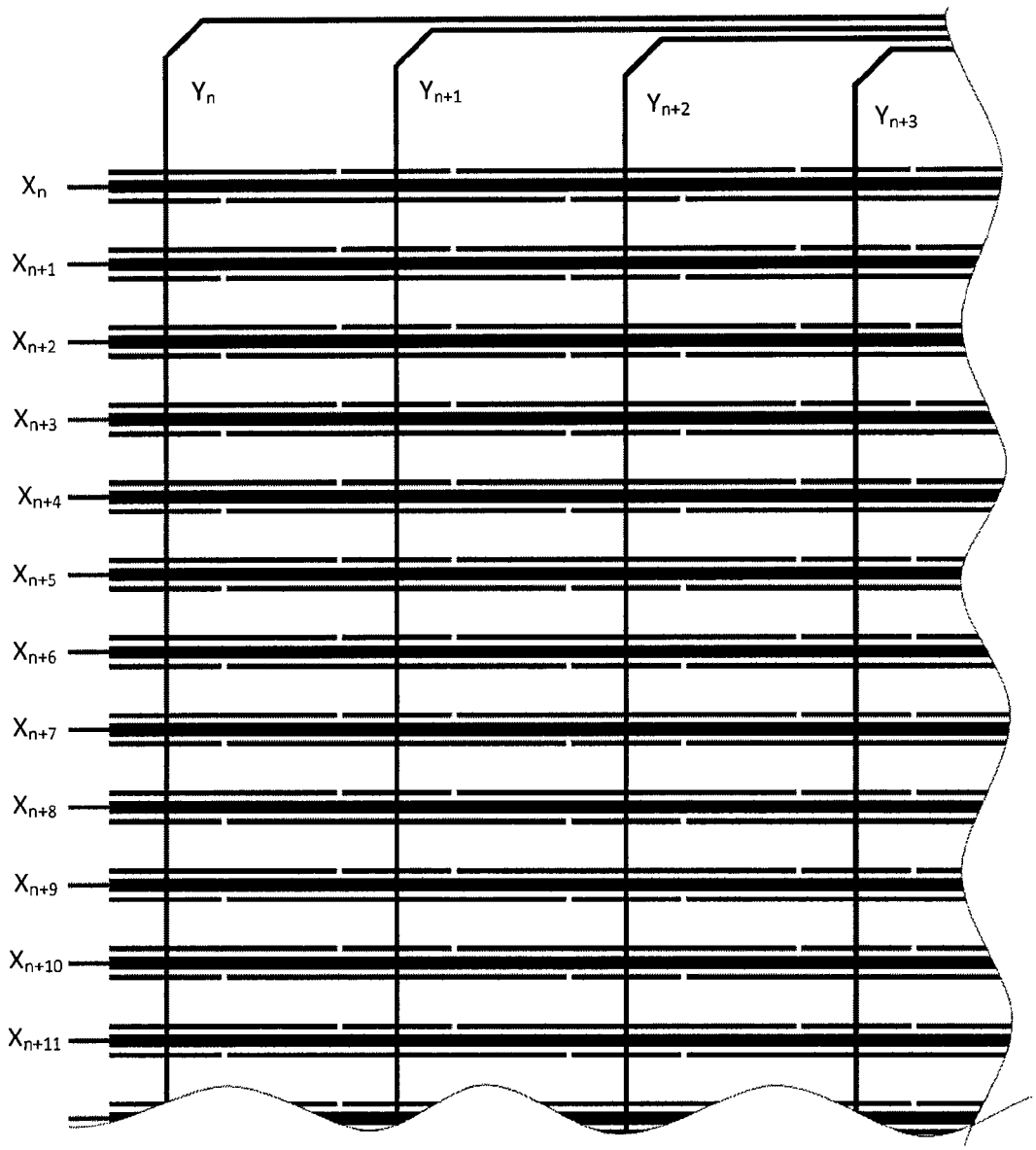
FIG. 16 illustrates schematically another exemplary arrangement of drive and sense electrodes of a panel.

FIG. 16 illustrates a fourth exemplary composite electrode pattern of drive and sense electrodes providing a panel of a position sensor. The drive and sense electrodes form a grid-like matrix. The drive electrodes are the thicker lines that extend substantially horizontally, in a first position sensing direction, across the page of FIG. 16. The sense electrodes are the thinner lines that extend substantially vertically, in a second position sensing direction, down the page, substantially perpendicular to the drive electrodes, and the thinner lines that extend across the page of FIG. 16 in the first position sensing direction. The sense electrodes which extend in the first position sensing direction surround an area of the drive electrodes.

Figure 18:
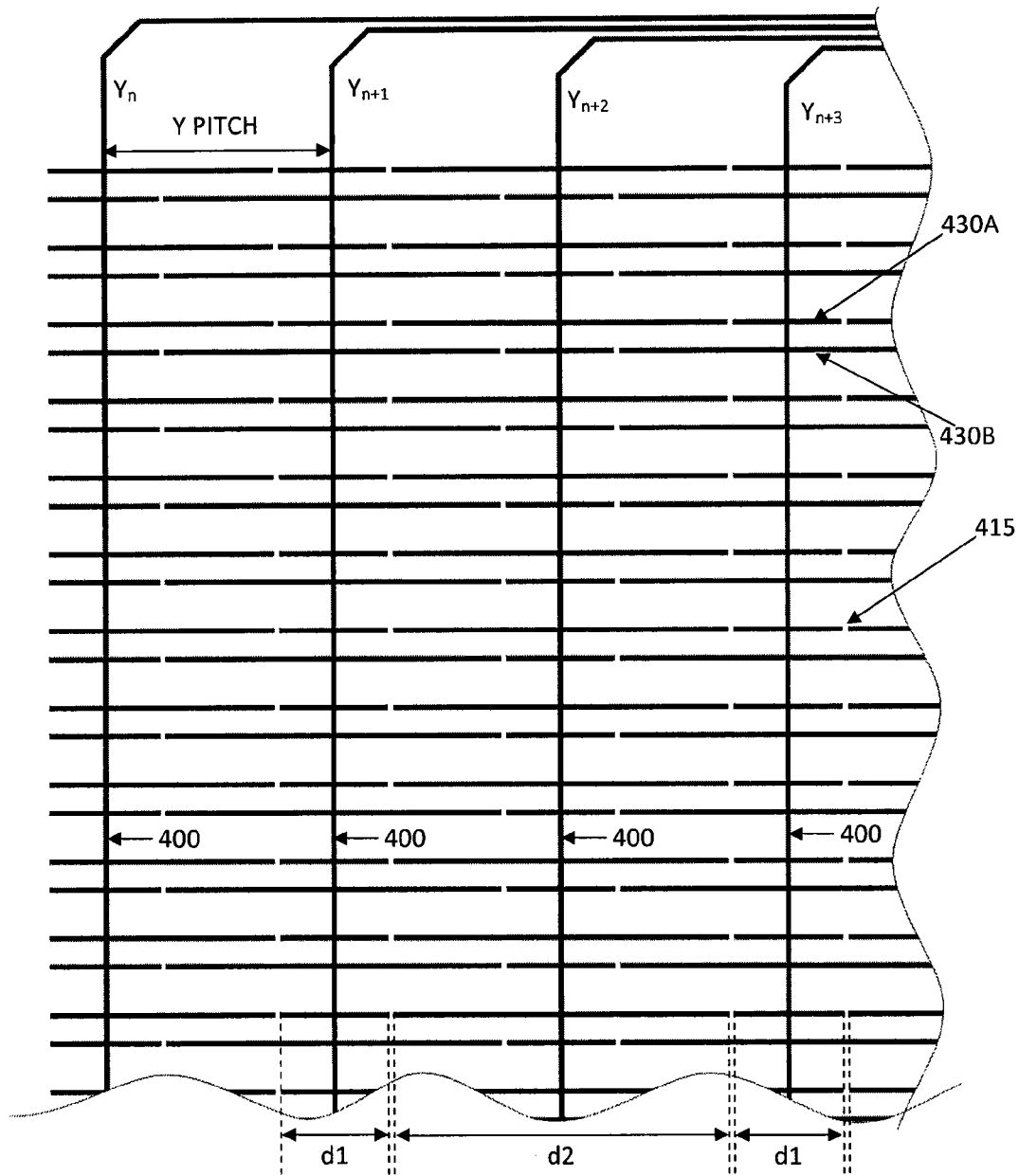
FIG. 18 illustrates schematically the sense electrodes of the panel of FIG. 16 and/or the panel of FIG. 17.

FIG. 18 illustrates the sense electrodes of the fourth electrode pattern illustrated in FIG. 16. As illustrated in FIGS. 16 and 18, the sense electrodes include first sense elements 400 that extend substantially vertically, and second sense elements 430A, 430B that extend substantially horizontally, substantially perpendicular to the first sense elements 400. Each second sense element 430A, 430B intersects one first sense element 400. The second sense elements 430A, 430B either have a first length (illustrated in FIG. 18 as second sense element 430A) or a second length, longer than the first length (illustrated in FIG. 18 as second sense element 430B). The two different length second sense elements 430A, 430B are arranged alternately, with a gap 415 provided between each second sense element 430A, 430B. The second sense elements 430A have a length $d_1$ as illustrated in FIG. 18 and the second sense elements 430B have a length $d_2$ as illustrated in FIG. 18.

The first sense elements 400 and the second sense elements 430A, 430B are electrically connected to sense channels Yn, Yn+1, Yn+2, . . . in FIGS. 16 and 18. As stated above, the second sense elements 430A, 430B surround the drive electrodes.

The second sense elements 430A, 430B enable the Y pitch, which is the distance between the centers of two adjacent first sense elements 400, illustrated in FIG. 18, to be increased. This is because the second sense elements 430A, 430B spatially interpolate the electric field distribution.

In one example, the width of the second sense elements 430A, 430B is substantially half the width of the first sense elements 400.

Figure 19:
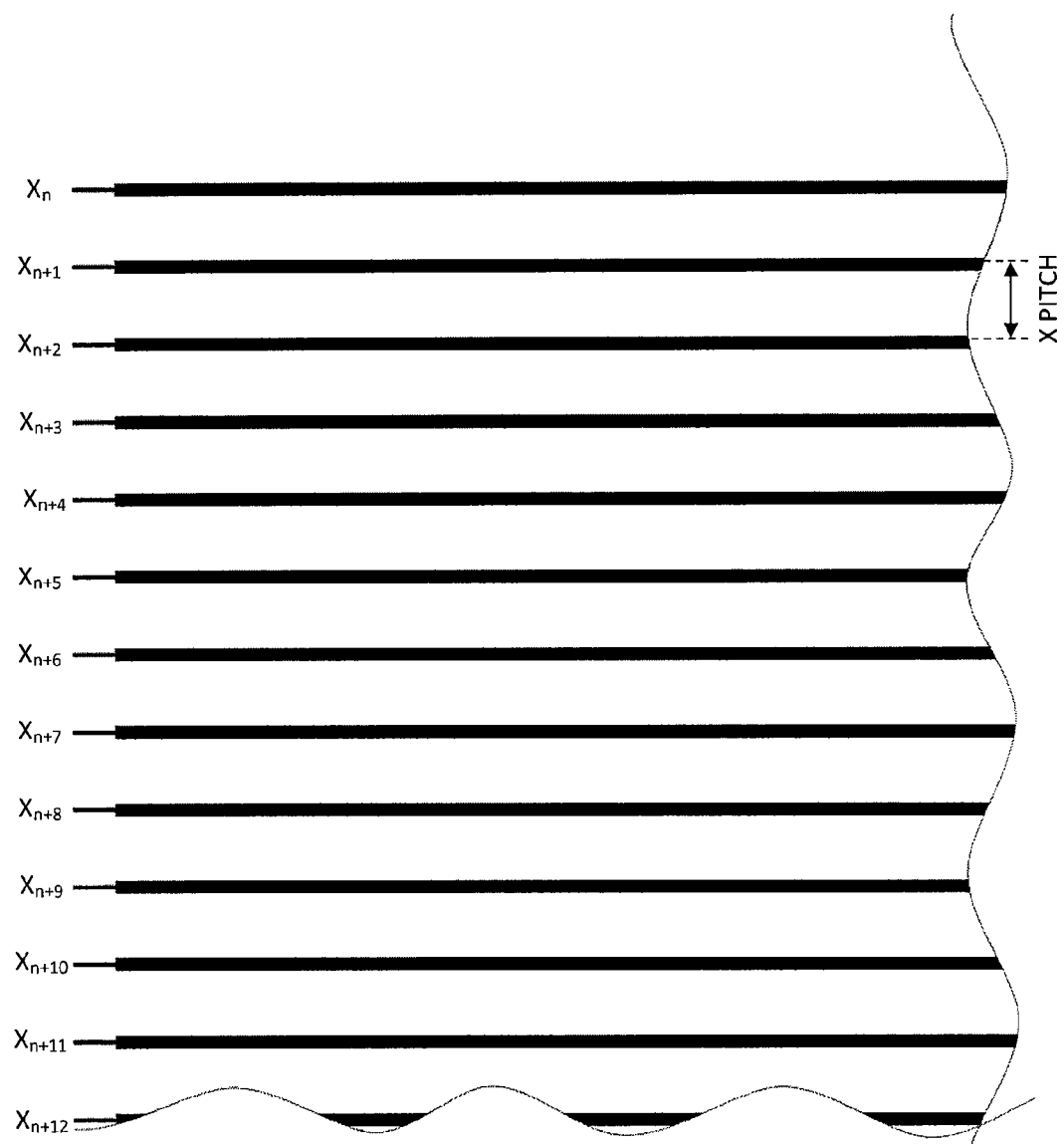
FIG. 19 illustrates schematically the drive electrodes of the panel of FIG. 16.

FIG. 19 illustrates the drive electrodes of the fourth electrode pattern illustrated in FIG. 16. The drive electrodes are connected to drive channels Xn, Xn+1, Xn+2, . . . in FIGS. 16 and 19. The X pitch, which is the distance between the top of a first drive electrode and the top of a second, adjacent, drive electrode, is illustrated in FIG. 19, and is equivalent to the distance between the center of a first drive electrode and the center of a second, adjacent, drive electrode.

Figure 17:
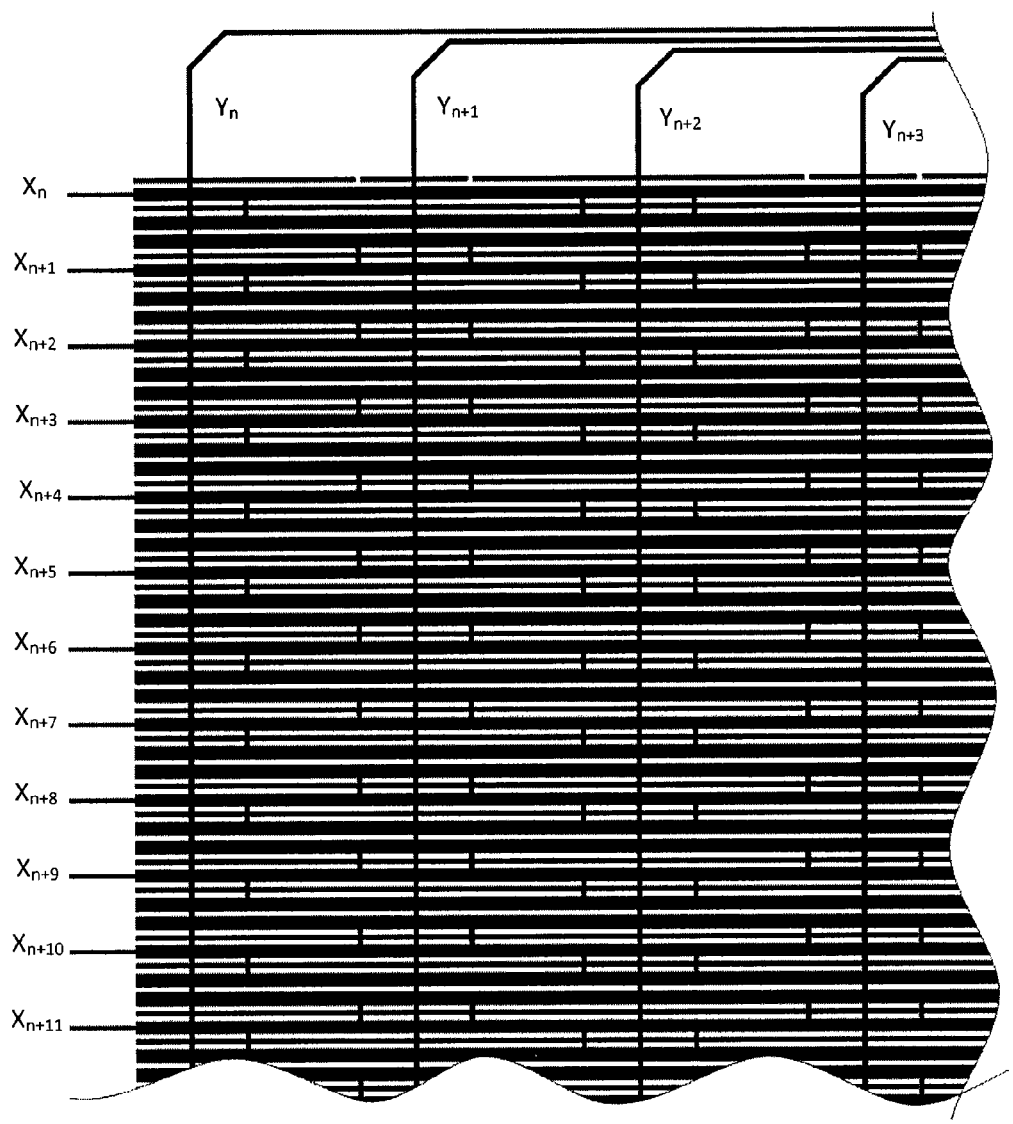
FIG. 17 illustrates schematically another exemplary arrangement of drive and sense electrodes of a panel.

FIG. 17 illustrates a fifth exemplary composite electrode pattern of drive and sense electrodes providing a panel of a position sensor. The drive and sense electrodes form a grid-like matrix. The drive electrodes are the thicker lines that extend substantially horizontally, in a first position sensing direction, across the page of FIG. 17. The sense electrodes are the thinner lines that extend substantially vertically, in a second position sensing direction, down the page, substantially perpendicular to the drive electrodes, and the thinner lines that extend across the page of FIG. 17, in a first position sensing direction. The sense electrodes which extend in the first position sensing direction are surrounded by the drive electrodes.

FIG. 18 illustrates the sense electrodes of the fifth electrode pattern illustrated in FIG. 17. As illustrated in FIGS. 17 and 18, the sense electrodes include first sense elements 400 that extend substantially vertically, and second sense elements 430A, 430B that extend substantially horizontally, substantially perpendicular to the first sense elements 400. Each second sense element 430A, 430B intersects one first sense element 400. The second sense elements 430A, 430B either have a first length (illustrated in FIG. 18 as second sense element 430A) or a second length, longer than the first length (illustrated in FIG. 18 as second sense element 430B). The two different length second sense elements 430A, 430B are arranged alternately, with a gap 415 provided between each second sense element 430A, 430B. The second sense elements 430A have a length $d_1$ as illustrated in FIG. 18 and the second sense elements 430B have a length $d_2$ as illustrated in FIG. 18.

The first sense elements 400 and the second sense elements 430A, 430B are electrically connected to sense channels Yn, Yn+1, Yn+2, . . . in FIGS. 17 and 18. As stated above, the drive electrodes surround the second sense elements 430A, 430B.

The second sense elements 430A, 430B enable the Y pitch, which is the distance between the centers of two adjacent first sense elements 400, illustrated in FIG. 18, to be increased. This is because the second sense elements 430A, 430B spatially interpolate the electric field distribution.

In one example, the width of the second sense elements 430A, 430B is substantially half the width of the first sense elements 400.

Figure 20:
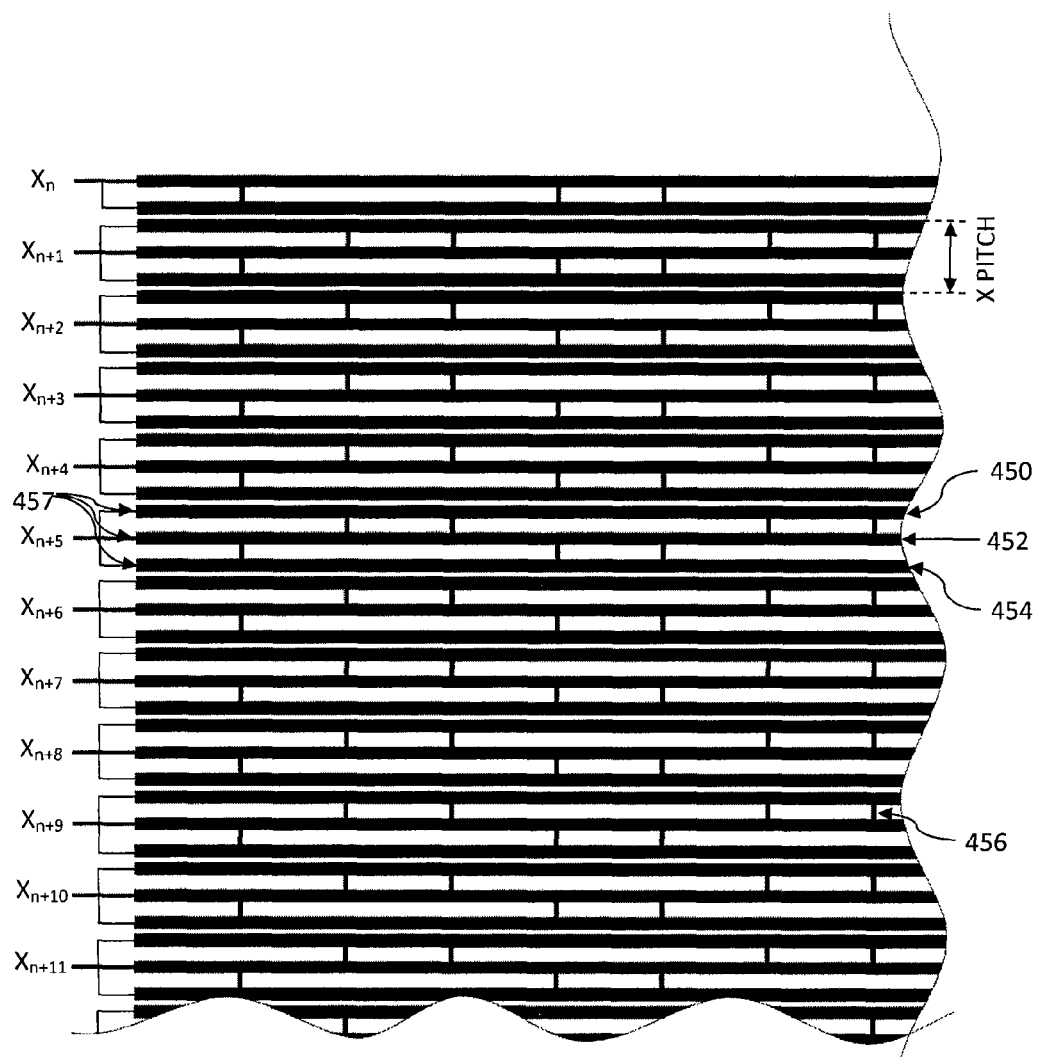
FIG. 20 illustrates schematically the drive electrodes of the panel of FIG. 17.

FIG. 20 illustrates the drive electrodes of the fifth electrode pattern illustrated in FIG. 17. Each drive electrode, except for the top and bottom edge drive electrodes edge (the top edge drive electrode is illustrated in FIG. 20), has three elements, a first (top) drive element 450, a second (middle) drive element 452 and a third (bottom) drive element 454, which are linked via connectors 456 and via connection points 457. As can be seen in FIG. 17, the connectors 456 are provided at the same position as the gaps 415 between the second sense elements 410A, 410B. Consequently, the sense electrodes do not overlap the drive electrodes or the overlaps may be minimized.

The drive electrodes are connected to drive channels Xn, Xn+1, Xn+2, . . . in FIGS. 17 and 20. The X pitch, which is the distance between the top of a first drive electrode and the top of a second, adjacent, drive electrode, is illustrated in FIG. 20, and is equivalent to the distance between the center of a first drive electrode and the center of a second, adjacent, drive electrode.

Each drive electrode illustrated in FIG. 17 surrounds a row of second sensing elements.

Figure 21:
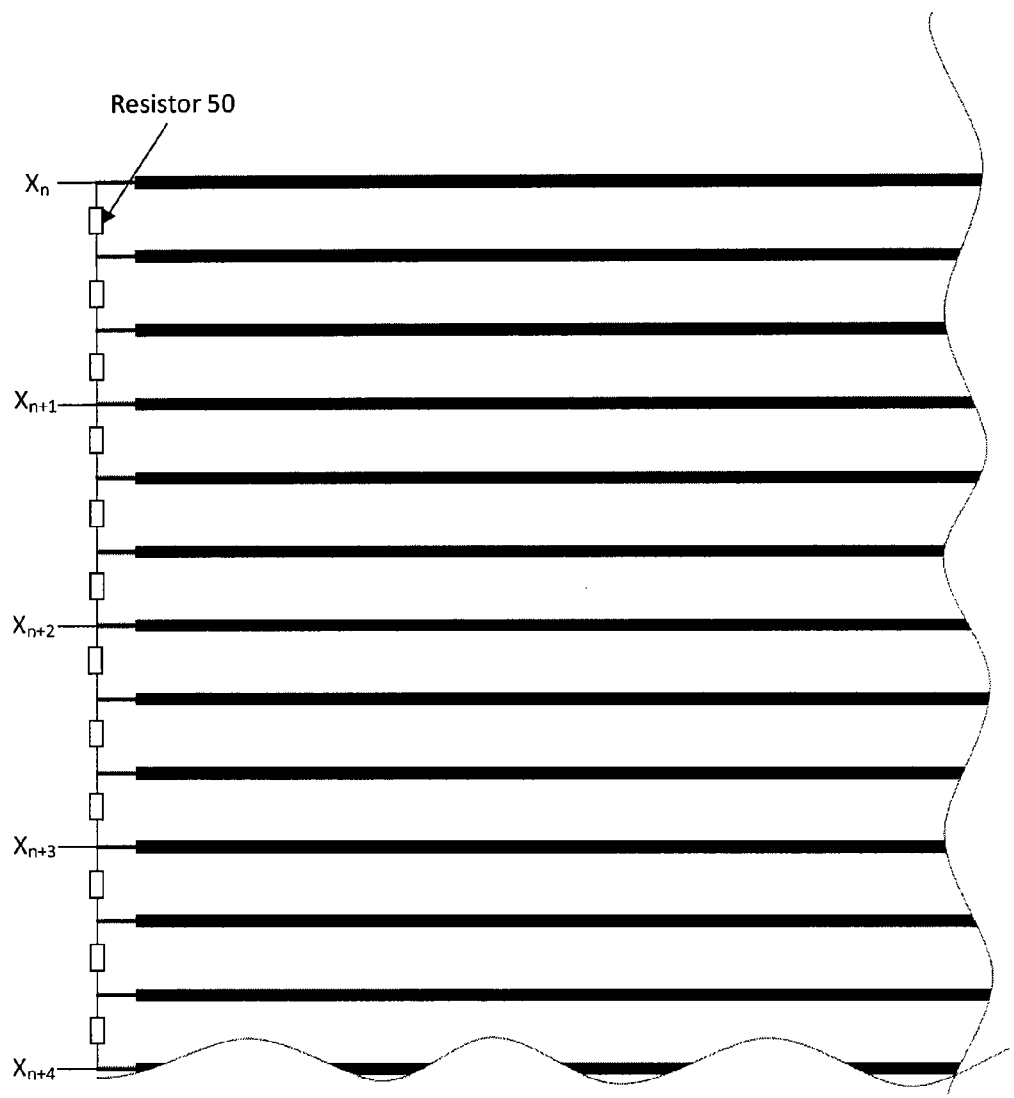
FIG. 21 illustrates schematically the drive electrodes of the panel of FIG. 16 with resistive interpolation.

FIG. 21 illustrates the drive electrodes of the fourth electrode pattern illustrated in FIGS. 16. and 19 arranged for resistive interpolation. Each drive electrode is coupled to its adjacent drive electrodes by a resistor 50. Each drive channel Xn, Xn+1, Xn+2, . . . provides drive signals to a group of five drive electrodes, except for the top edge and bottom edge drive channel (Xn or Xn+4 illustrated in FIG. 21), which supplies three drive electrodes. However, the interpolation might be over any number of electrodes, and is not limited to five electrodes. In this arrangement fewer drive channels are required, when compared to the electrode pattern of FIG. 19. As one X channel is driven at a time while all other X channels are grounded, the resistors 50 form a resistive ladder and hence provide the X electrodes with fractional amplitudes of the drive signal. Although FIG. 21 illustrates the resistors 50 being provided on the left hand side of the panel, the resistors 50 may be provided on the right hand side of the panel or on both sides of the panel.

Figure 22:
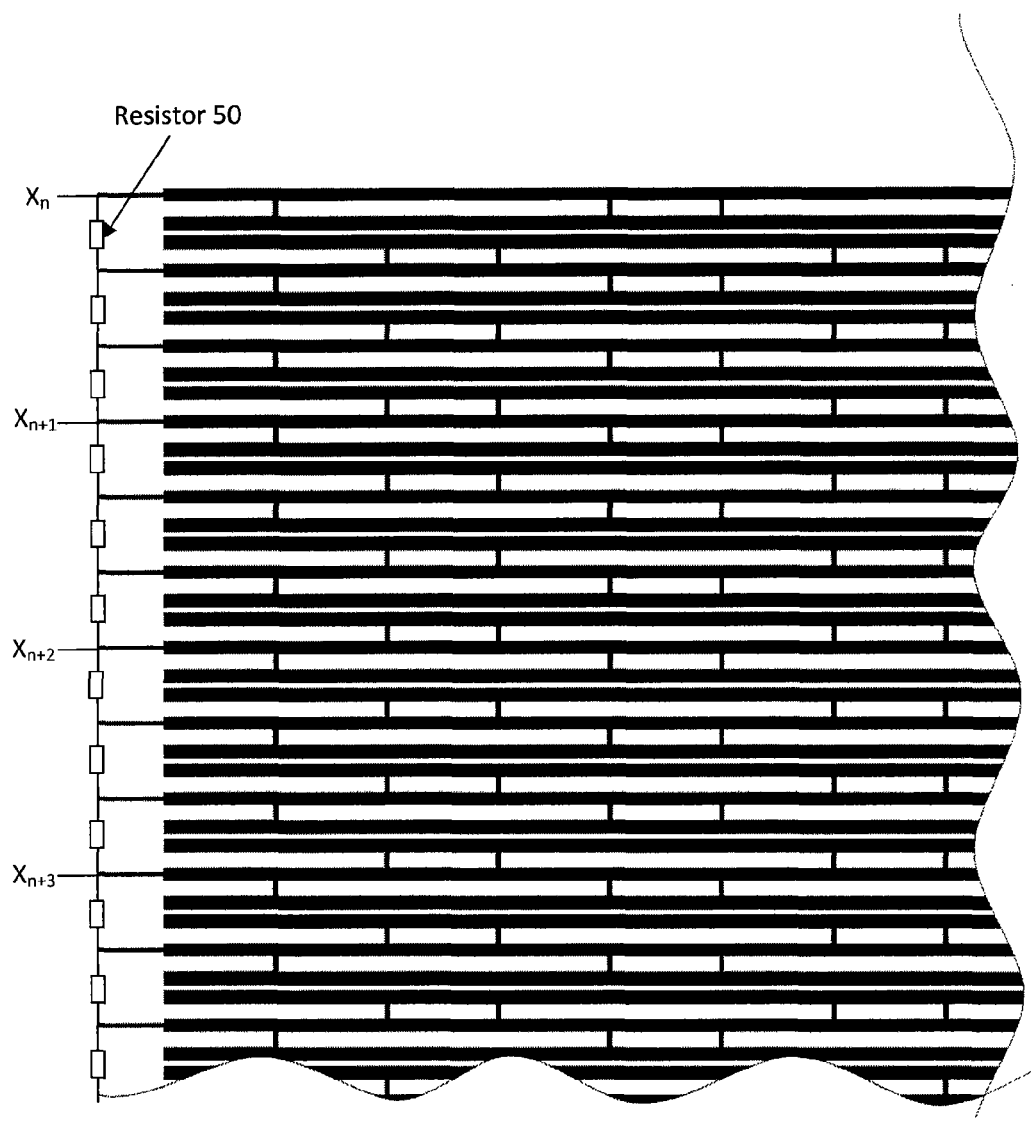
FIG. 22 illustrates schematically the drive electrodes of the panel of FIG. 17 with resistive interpolation.

FIG. 22 illustrates the drive electrodes of the fifth electrode pattern illustrated in FIGS. 17 and 20 arranged for resistive interpolation. Each drive electrode is coupled to its adjacent drive electrodes by a resistor 50. Each drive channel Xn, Xn+1, Xn+2, . . . provides drive signals to a group of five drive electrodes, except for the top edge and bottom edge drive channel (the top edge drive channel Xn is illustrated in FIG. 22), which supplies three drive electrodes. However, the interpolation might be over any number of electrodes, and is not limited to five electrodes. In this arrangement fewer drive channels are required, when compared to the electrode pattern of FIG. 20. As one X channel is driven at a time while all other X channels are grounded, the resistors 50 form a resistive ladder and hence provide the X electrodes with fractional amplitudes of the drive signal. Although FIG. 22 illustrates the resistors 50 being provided on the left hand side of the panel, the resistors 50 may be provided on the right hand side of the panel or on both sides of the panel.

FIGS. 14A, 14B, 15, 21 and 22 illustrate drive electrodes arranged for resistive interpolation. These examples use physical resistors 50 to electrically interpolate the electrodes. The use of resistors 50 enables a simpler electrode design and larger sensors to be constructed, since the length of a position sensor can be increased as extra segments are created using the resistive dividers on the drive electrodes. Although shown as discrete components, resistors 50 need not be discrete components. For example, resistors 50 can be constructed of resistive material such as carbon, Indium Tin Oxide (ITO), and the like. Thus the resistors 50 can be constructed on the sensor using the resistive nature of the electrode material (e.g., ITO).

Although FIGS. 9A through 22 illustrate a matrix of twelve drive electrodes and four sense electrodes, any number of drive and sense electrodes may be provided to create a panel 210 as required. In addition, the drive electrodes may not always be thicker than the sense electrodes. The drive and sense electrodes may be the same thickness, or the sense electrodes may be thicker than the drive electrodes.

Figure 25:
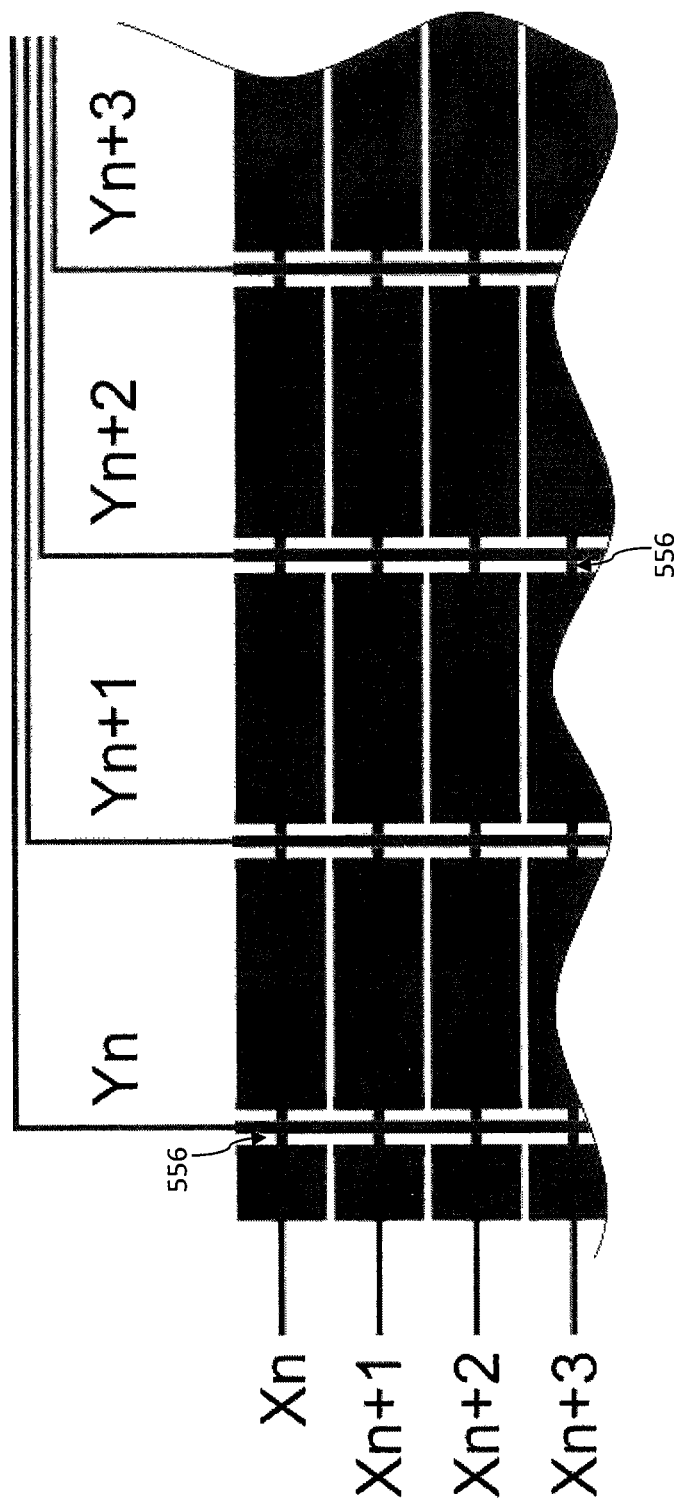
FIG. 25 illustrates schematically another exemplary arrangement of drive and sense electrodes of a panel.

FIG. 25 illustrates a sixth exemplary composite electrode pattern of drive and sense electrodes providing a panel of a position sensor. The drive and sense electrodes form a grid-like matrix. The drive electrodes are the lines that extend substantially horizontally, in the first position sensing direction, across the page of FIG. 25. The sense electrodes are the lines that extend substantially vertically, in the second position sensing direction, substantially perpendicular to the drive electrodes, down the page of FIG. 25. The drive electrodes are connected to drive channels Xn, Xn+1, Xn+2, . . . in FIG. 25. The sense electrodes are electrically connected to sense channels Yn, Yn+1, Yn+2, . . . in FIG. 25.

The drive electrodes illustrated in FIG. 25 are substantially thicker than the sense electrodes.

As with the first to fifth exemplary electrode patterns described above, the drive and sense electrodes are fabricated such that the drive electrodes are not provided directly behind the sense electrodes in the stack arrangements. The sense electrodes do not overlap the drive electrodes or the overlaps are minimized. This can be seen in FIG. 25, where the drive electrodes reduce from thick lines down to thin connectors 556 at the intersection with the sense electrodes.

Figure 26:
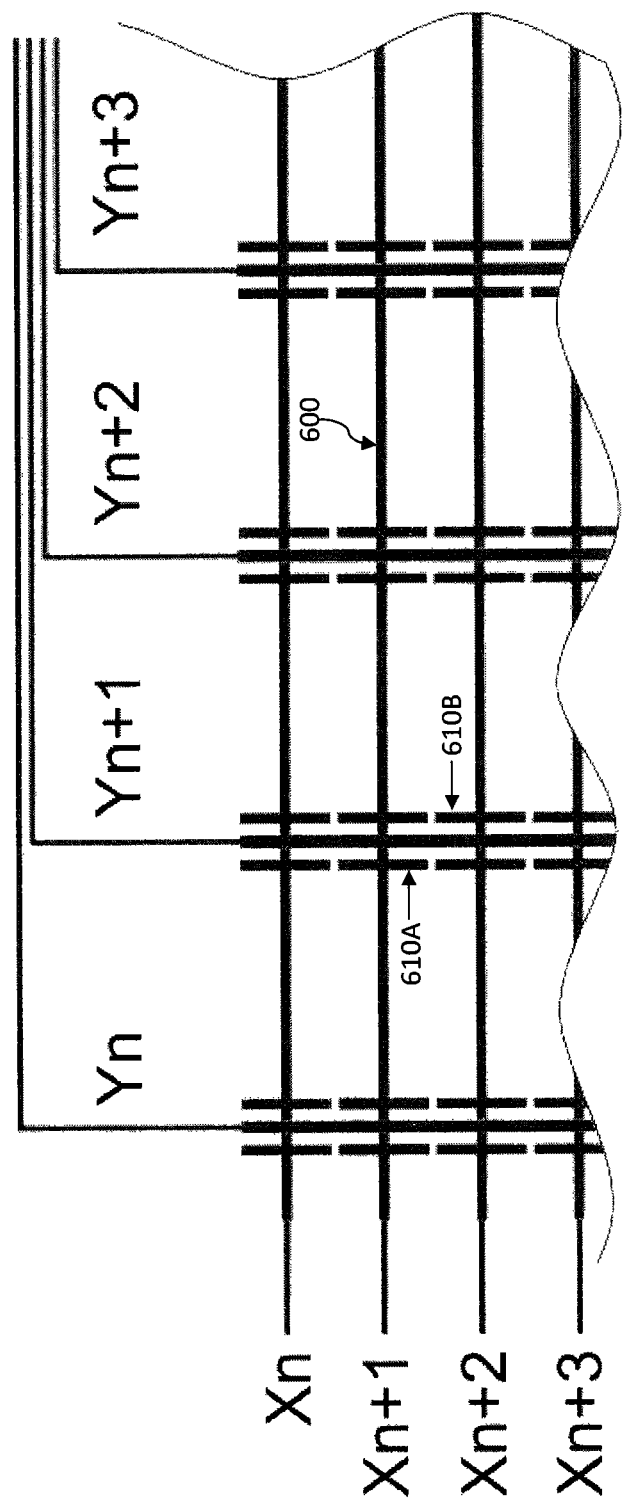
FIG. 26 illustrates schematically another exemplary arrangement of drive and sense electrodes of a panel.

FIG. 26 illustrates a seventh exemplary composite electrode pattern of drive and sense electrodes providing a panel of a position sensor. The drive and sense electrodes form a grid-like matrix. The sense electrodes are the lines that extend substantially vertically, in the second position sensing direction, down the page of FIG. 26. The drive electrodes are the lines that extend substantially horizontally, in the first position sensing direction, substantially perpendicular to the sense electrodes, across the page of FIG. 26, and the "short" lines that extend substantially vertically, in the second position sensing direction, down the page of FIG. 26. The drive electrodes are connected to drive channels Xn, Xn+1, Xn+2, . . . in FIG. 26. The sense electrodes are electrically connected to sense channels Yn, Yn+1, Yn+2, . . . in FIG. 26.

As illustrated in FIG. 26, the drive electrodes include first drive elements 600 that extend substantially horizontally, in the first position sensing direction, across the page of FIG. 26, and second drive elements 610A, 610B that extend substantially vertically, in the second position sensing direction, down the page of FIG. 26, substantially perpendicular to the first position sensing direction. Each set of second drive elements 610A, 610B are provided to surround an area of the sense electrodes.

As with the first to sixth exemplary electrode patterns described above, the drive and sense electrodes are fabricated such that the drive electrodes are not provided directly behind the sense electrodes in the stack arrangements. The sense electrodes do not overlap the drive electrodes or the overlaps are minimized.

Although FIGS. 25 and 26 illustrate a matrix of four drive electrodes and four sense electrodes, any number of drive and sense electrodes may be provided to create a panel 210 as required.

Figure 23:
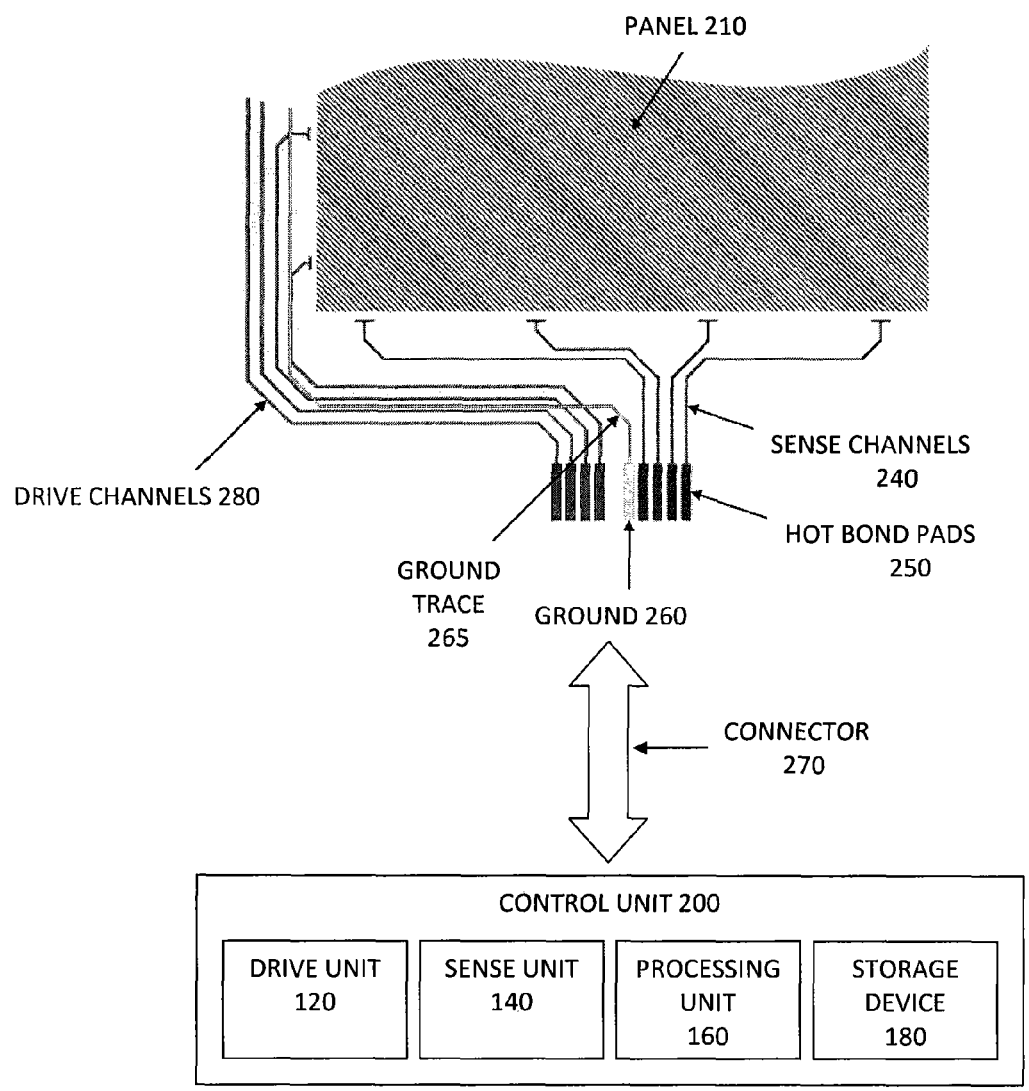
FIG. 23 illustrates schematically a connection of a panel to a control unit.

FIG. 23 illustrates schematically a panel 210 including a plurality of drive electrodes (not illustrated) connected to drive channels 280 and a plurality of sense electrodes (not illustrated) connected to sense channels 240. The panel 210 may have any one of the exemplary first through seventh electrode patterns described above with reference to FIGS. 9A through 22 and FIGS. 25 and 26. The drive channels 280 and the sense channels 240 are connected to a control unit 200 via a connector 270. The connector 270 may be a conductive trace or a feed-through.

The control unit 200 includes a drive unit 120 for supplying drive signals to the drive electrodes, a sense unit 140 for sensing signals from the sense electrodes, and a processing unit 160 for sensing a touch or a proximity of an object and determining its position based on the received sense signals. The control unit 200 thus controls the operation of the drive and sense units 120, 140 and the processing of responses from the sense unit 140 in the processing unit 160. The control unit 200 may also include a storage device 180, such as a computer readable medium. The processing unit 160 may be any known processor, such as a microcontroller, microprocessor, or central processor.

The scanning sequence may measure each row and column coupling capacitance at each intersection or node.

Although the drive unit 120, sensing unit 140, and processing unit 160 are illustrated as separate components in FIG. 23, the functionality of these units may be provided in a single integrated circuit chip such as a general purpose microprocessor, a microcontroller, a field programmable gate array (FPGA), or an application specific integrated circuit (ASIC). In addition, a separate drive unit may be provided for each drive channel connected to each electrode.

Figure 24:
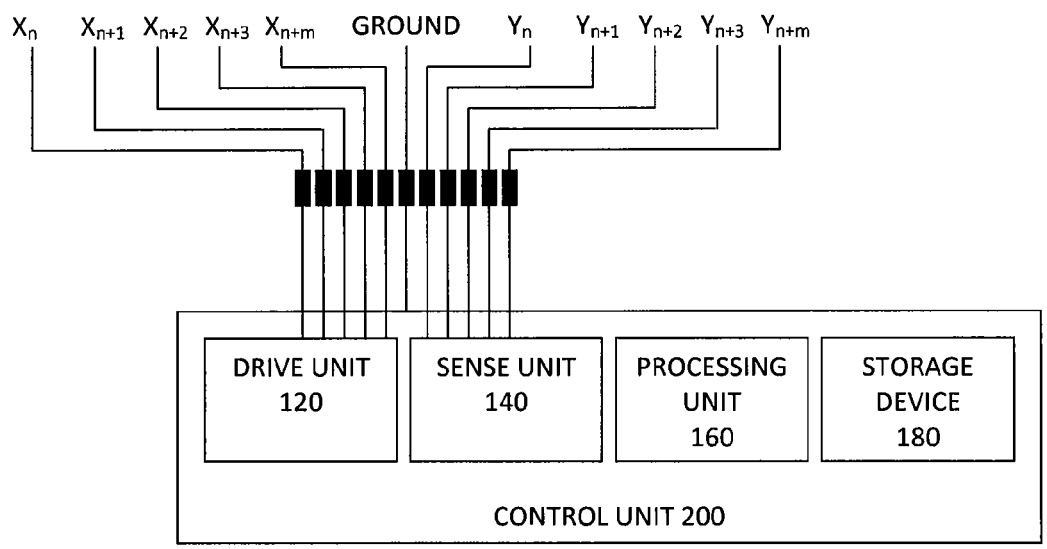
FIG. 24 illustrates schematically in more detail a connection of a panel to a control unit.

As illustrated in FIG. 24 the drive channels Xn, Xn+1, Xn+2, . . . Xn+m are connected to the drive unit 120, although in one example, each drive channel is connected to a separate drive unit 120. In addition, the sense channels Yn, Yn+1, Yn+2, . . . Yn+m are connected to the sense unit 140. In one example, in the case of the drive channels arranged for resistive interpolation, the drive channel for every group of electrodes is connected to the drive unit 120 or a separate drive unit.

The position sensors described above can be attached to numerous electronic devices, such as computers, personal digital assistants (PDAs), satellite navigation devices, mobile phones, portable media players, portable game consoles, public information kiosks, point of sale systems, and the like.

These electronic devices may include a central processor or other processing device for executing program instructions, an internal communication bus, various types of memory or storage media (RAM, ROM, EEPROM, cache memory, disk drives, and the like.) for code and data storage, and one or more network interface cards or ports for communication purposes.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

What is claimed is:

1. A panel for a position sensor, comprising:
   a substrate;
   drive electrodes extending in a first direction on the substrate, that drive one or more drive signals; and
   sense electrodes provided on the substrate, the sense electrodes being capacitively coupled with the drive electrodes and arranged to sense one or more signals, wherein:
      each of the sense electrodes comprises a first sense element extending in a second direction substantially perpendicular to the first direction, and at least one second sense element extending in the first direction;
      each of the second sense elements intersects and connects with one of the first sense elements; and
      areas of the second sense elements on the substrate are surrounded by the drive electrodes on the substrate, at least one second sense element of a first sense electrode forming a non-contact overlap area with at least one of the second sense elements of an adjacent sense electrode, wherein the non-contact overlap area is situated between two first sense elements.

2. The panel according to claim 1, wherein each of the drive electrodes on the substrate surrounds areas of a row of second sensing elements.

3. The panel according to claim 1, wherein each second sense element of each sense electrode forms a non-contact overlap area with one of the second sense elements of at least one adjacent sense electrode, wherein each non-contact overlap area is situated between two first sense elements.

4. The panel according to claim 1, wherein each drive electrode is coupled to its adjacent drive electrodes by a resistor for resistive interpolation.

5. The panel according to claim 1, wherein the drive electrodes comprise a larger surface area than the sense electrodes.

6. The panel according to claim 1, wherein each of the drive electrodes comprises:
   second drive elements extending in the second direction connected with one of the drive electrodes extending in the first direction.

7. The panel according to claim 1, wherein the drive electrodes are provided adjacent to the substrate, and the panel further comprises:
   an adhesive layer provided adjacent to the drive electrodes;
   the sense electrodes are provided adjacent to the adhesive layer;
   a second substrate provided adjacent to the sense electrodes;
   a second adhesive layer provided adjacent to the second substrate; and
   a front panel provided adjacent to the second adhesive layer.

8. The panel according to claim 1, wherein the drive electrodes and the sense electrodes are provided adjacent to the substrate, and the panel further comprises:
   an adhesive layer provided adjacent to the drive electrodes and the sense electrodes; and
   a front panel provided adjacent to the adhesive layer;
   wherein crossovers are used at the point of intersection of the drive and sense electrodes with a dielectric insulator to prevent shorting.

9. A position sensor comprising:
   a panel comprising:
      a substrate;
      drive electrodes extending in a first direction on the substrate;
      sense electrodes provided on the substrate, the sense electrodes being capacitively coupled with the drive electrodes and arranged to sense one or more signals, wherein:
         each of the sense electrodes comprises a first sense element extending in a second direction substantially perpendicular to the first direction, and at least one second sense element extending in the first direction;
         each of the second sense elements intersects and connects with one of the first sense elements; and
         areas of the second sense elements on the substrate are surrounded by the drive electrodes on the substrate, at least one second sense element of a first sense electrode forming a non-contact overlap area with at least one of the second sense elements of an adjacent sense electrode, wherein the non-contact overlap area is situated between two first sense elements;
   a drive unit coupled to the drive electrodes that supply the one or more drive signals to each of the drive electrodes;
   a sense unit coupled to the sense electrodes that receive the signals from each of the sense electrodes; and
   a processing unit that process the signals and determines a position of a touch or a proximity of a touch at the panel.

10. The position sensor according to claim 9, wherein the sense unit is coupled to each of the first sense elements of the sense electrodes.

11. The position sensor according to claim 9, wherein the drive unit comprises a plurality of drive units, each of the plurality of drive units coupled to one of the drive electrodes.

12. The position sensor according to claim 9, wherein each drive electrode is coupled to its adjacent drive electrodes by a resistor, and wherein the drive unit supplies the one or more drive signals to each group of three drive electrodes.

13. A panel for a position sensor, comprising:
   a substrate;
   drive electrodes extending in a first direction on the substrate, that receive one or more drive signals; and
   sense electrodes extending in a second direction substantially perpendicular to the first direction on the substrate, the sense electrodes being capacitively coupled with the drive electrodes and arranged to supply one or more signals, wherein:
      each of the sense electrodes comprises a first sense element extending in the second direction substantially perpendicular to the first direction, and at least one second sense element extending in the first direction; and
      each of the second sense elements intersects and connects with one of the first sense elements, at least one second sense element of a first sense electrode forming a non-contact overlap area with at least one of the second sense elements of an adjacent sense electrode, wherein the non-contact overlap area is situated between two first sense elements, wherein:
the drive electrodes are not provided directly behind the sense electrodes on the substrate or the overlap is minimized.

* * * * *